(12) United States Patent
Lee et al.

(10) Patent No.: US 11,768,558 B2
(45) Date of Patent: Sep. 26, 2023

(54) TOUCH SENSING CIRCUIT AND ITS METHOD FOR SENSING MULTI-FREQUENCY SIGNALS

(71) Applicant: LX Semicon Co., Ltd., Daejeon (KR)

(72) Inventors: Kyu Tae Lee, Daejeon (KR); Mun Seok Kang, Daejeon (KR); Jae Hwan Lee, Daejeon (KR); Jeong Kwon Nam, Daejeon (KR); Hyun Soo Chung, Daejeon (KR); Jin Yoon Jang, Daejeon (KR); Hee Ra Yun, Daejeon (KR); Yeon Ju Yu, Daejeon (KR)

(73) Assignee: LX SEMICON CO., LTD., Daejeon (KR)

(*) Notice: Subject to any disclaimer, the term of this patent is extended or adjusted under 35 U.S.C. 154(b) by 5 days.

(21) Appl. No.: 17/552,270

(22) Filed: Dec. 15, 2021

(65) Prior Publication Data

US 2022/0197468 A1 Jun. 23, 2022

(30) Foreign Application Priority Data

Dec. 21, 2020 (KR) .................. 10-2020-0179469

(51) Int. Cl.
*G06F 3/044* (2006.01)
*G06F 3/041* (2006.01)

(52) U.S. Cl.
CPC ........ *G06F 3/04166* (2019.05); *G06F 3/0441* (2019.05); *G06F 3/0442* (2019.05)

(58) Field of Classification Search
CPC .......... G06F 3/041; G06F 3/044; G06F 3/047; G06F 3/03545; G06F 3/0416
See application file for complete search history.

(56) References Cited

U.S. PATENT DOCUMENTS

| 6,043,810 | A  | * | 3/2000  | Kim ....................... G06F 3/045 345/173 |
| 9,891,762 | B2 | * | 2/2018  | Lee ........................ G06F 3/0412 |
| 10,466,834 | B2 | * | 11/2019 | Han ..................... G06F 3/04166 |
| 10,845,897 | B2 | * | 11/2020 | Forlines ................ G06F 3/0488 |
| 2004/0155871 | A1 | * | 8/2004  | Perski ................... G06F 3/0446 345/174 |
| 2007/0242056 | A1 | * | 10/2007 | Engelhardt ......... G06F 3/04883 345/173 |

(Continued)

FOREIGN PATENT DOCUMENTS

| KR | 10-1598790 B1 | 3/2016 |
| KR | 10-2018-0003816 A | 1/2018 |
| KR | 10-2018-0020696 A | 2/2018 |

*Primary Examiner* — Olga V Merkoulova
(74) *Attorney, Agent, or Firm* — ROTHWELL, FIGG, ERNST & MANBECK, P.C.

(57) ABSTRACT

The present disclosure provides a touch sensing circuit comprising an analog signal processing circuit configured to receive a plurality of sensing signals having different frequencies from touch electrodes; and a digital signal processing circuit configured to receive output data of the analog signal processing circuit and perform a discrete Fourier transform. In addition, the present disclosure provides a touch sensing circuit comprising the digital signal processing circuit of the touch sensing circuit that separates the plurality of sensing signals through the discrete Fourier transform and allowing a simultaneous sensing of a finger touch and a stylus pen touch.

13 Claims, 19 Drawing Sheets

(56) References Cited

U.S. PATENT DOCUMENTS

| | | | |
|---|---|---|---|
| 2014/0327644 A1* | 11/2014 | Mohindra | G06F 3/044 |
| | | | 345/174 |
| 2015/0062081 A1* | 3/2015 | Lee | G06F 3/0446 |
| | | | 345/174 |
| 2015/0153868 A1* | 6/2015 | Tiew | G06F 3/04166 |
| | | | 345/174 |
| 2016/0132147 A1* | 5/2016 | Lim | G06F 3/04182 |
| | | | 345/174 |
| 2016/0202809 A1* | 7/2016 | Tang | G06F 3/04166 |
| | | | 345/174 |
| 2016/0231854 A1* | 8/2016 | Koo | G06F 3/047 |
| 2016/0282991 A1* | 9/2016 | Wu | G06F 3/044 |
| 2018/0004324 A1 | 1/2018 | Park | |
| 2018/0267639 A1* | 9/2018 | Han | G06F 3/0418 |
| 2018/0329563 A1* | 11/2018 | Han | G06F 3/04162 |
| 2019/0171320 A1* | 6/2019 | Kim | G06F 3/0443 |
| 2019/0317615 A1* | 10/2019 | Forlines | G06F 3/03545 |
| 2020/0089385 A1* | 3/2020 | Han | G06F 3/04182 |

\* cited by examiner

TOUCH SENSING CIRCUIT AND ITS METHOD FOR SENSING MULTI-FREQUENCY SIGNALS

CROSS REFERENCE TO RELATED APPLICATION

This application claims priority from Korean Patent Application No. 10-2020-0179469, filed on Dec. 21, 2020, which is hereby incorporated by reference for all purposes as if fully set forth herein.

BACKGROUND

1. Technical Field

The present disclosure relates to a touch sensing circuit capable of sensing touches by a stylus pen and a finger, and more particularly, to a touch sensing circuit capable of sensing multi-frequency signals, a touch panel including the same and a touch sensing method of a display device.

2. Related Art

Technology for recognizing an external object in proximity to or in touch with a touch panel is referred to as touch sensing technology. The touch panel is placed at the same position as a display panel on a plane, and accordingly, users may input a user control signal into the touch panel while viewing an image displayed on the display panel. This method of generating the user control signal is remarkably intuitive for the user compared to other, previous, user control signal input types, for example, a mouse input type and a keyboard input type.

Due to such an advantage, the touch sensing technology is applied to various electronic devices including display panels. A touch sensing circuit may supply a driving signal to a driving electrode disposed in a touch panel, may receive a response signal formed in a sensing electrode, and thereby, may sense a touch or an approach of an external object to the touch panel. The touch panel may generate capacitance between the driving electrode and the sensing electrode, and a change in the capacitance may indicate the touch or the approach of the external object.

A frequency of a sensing signal generated according to a touch or proximity of an object is determined according to a frequency of a driving signal supplied to the driving electrode of the touch panel. Thus, by differently setting a frequency of a signal, received from each sensing line of the touch panel, according to a type of the object, more accurate touch sensing may be performed.

When a frequency of a signal transmitted by a stylus pen is set to be different from a frequency of the driving signal of the touch panel, a touch of the stylus pen and a touch of a finger may be distinguished from each other. In order to recognize signals of different frequencies, time periods separated in terms of time are set, and separate touch sensing is performed for each type of touch.

However, when a touch sensing time period is divided to receive signals of different frequencies in the touch sensing circuit and the signals of the respective frequencies are individually received according to time periods, a total touch sensing time increases. In the conventional touch sensing method by time division, as a sensing time increases, a problem is caused in that the power consumption of a display device increases.

Also, structures for distinguishing a touch of the stylus pen and a touch of the finger should be designed as separate circuits. Since the size of the touch sensing circuit required to recognize all of different types of touches increases, it is difficult to reduce the size of the display device.

SUMMARY

Under such a background, in one aspect, various embodiments are directed to providing touch sensing technology, capable of incorporating an analog signal processing circuit in a readout circuit of a touch sensing circuit and of simultaneously sensing touches of a stylus pen and a finger in a digital signal processing circuit, thereby reducing the touch sensing time and power consumption of a display device.

In one aspect, an embodiment may provide a touch sensing circuit including: an analog signal processing circuit configured to receive a plurality of sensing signals having different frequencies from touch electrodes; and a digital signal processing circuit configured to receive output data of the analog signal processing circuit and to perform a discrete Fourier transform, wherein the digital signal processing circuit separates the plurality of sensing signals by the discrete Fourier transform.

The plurality of sensing signals may comprise signals having a driving frequency of a touch panel and signals having a transmission frequency of a stylus pen.

The analog signal processing circuit may include: at least one buffer configured to convert the sensing signals into current signals; a filter configured to perform filtering according to a predetermined passband for signals which have passed through the buffer; and an analog-to-digital converter configured to convert filtered analog signals into digital signals.

The analog signal processing circuit may change its operation in response to a driving mode of the digital signal processing circuit.

The digital signal processing circuit may simultaneously separate a plurality of signals by a sliding discrete Fourier transform.

The touch sensing circuit may further comprise: a touch control circuit configured to control a driving signal of a touch panel such that the orthogonality between frequencies of signals separated by the digital signal processing circuit is maintained.

In another aspect, an embodiment may provide a readout circuit including: a driving circuit configured to output, to a touch panel, driving signals for a first type of sensing mode and a second type of sensing mode; and a reception circuit configured to receive a sensing signal by the first type of sensing mode and a sensing signal by the second type of sensing mode, wherein a digital signal processing circuit in the reception circuit receives the sensing signals.

The first type of sensing mode may be a finger touch sensing mode and the second type of sensing mode may be a stylus pen touch sensing mode.

The driving circuit may transfer a frequency corresponding to a frequency of a protocol of a stylus pen.

The reception circuit may sense the sensing signal by the first type of sensing mode and the sensing signal by the second type of sensing mode in a same time period.

The digital signal processing circuit may process sensing signals by a discrete Fourier transform.

The digital signal processing circuit may separate sensing signals having different frequencies.

In still another aspect, an embodiment may provide a touch sensing method including: receiving a first touch signal having a first frequency; receiving a second touch signal having a second frequency distinguished from the first frequency; and separating the touch signals respectively having the first frequency and the second frequency by a discrete Fourier transform.

A touch sensing circuit may receive the first touch signal and the second touch signal in a same time period.

The touch sensing method may further include: determining the orthogonality between the first touch signal and the second touch signal based on the first frequency and the second frequency of the touch signals separated by the discrete Fourier transform.

As is apparent from the above description, according to the embodiments, since different frequency signals are separately sensed, it is possible to provide a touch sensing circuit capable of simultaneously sensing a plurality of objects and reducing a touch driving time of a display device.

Also, according to the embodiments, by combining an analog signal processing circuit and a digital signal processing circuit of a readout circuit, it is possible to provide a more efficient and simplified touch sensing circuit.

Further, according to the embodiments, it is possible to increase a data sampling rate and reduce the power consumption of the display device.

In addition, according to the embodiments, it is possible to reduce the area of the analog signal processing circuit.

DETAILED DESCRIPTION

Figure 1:
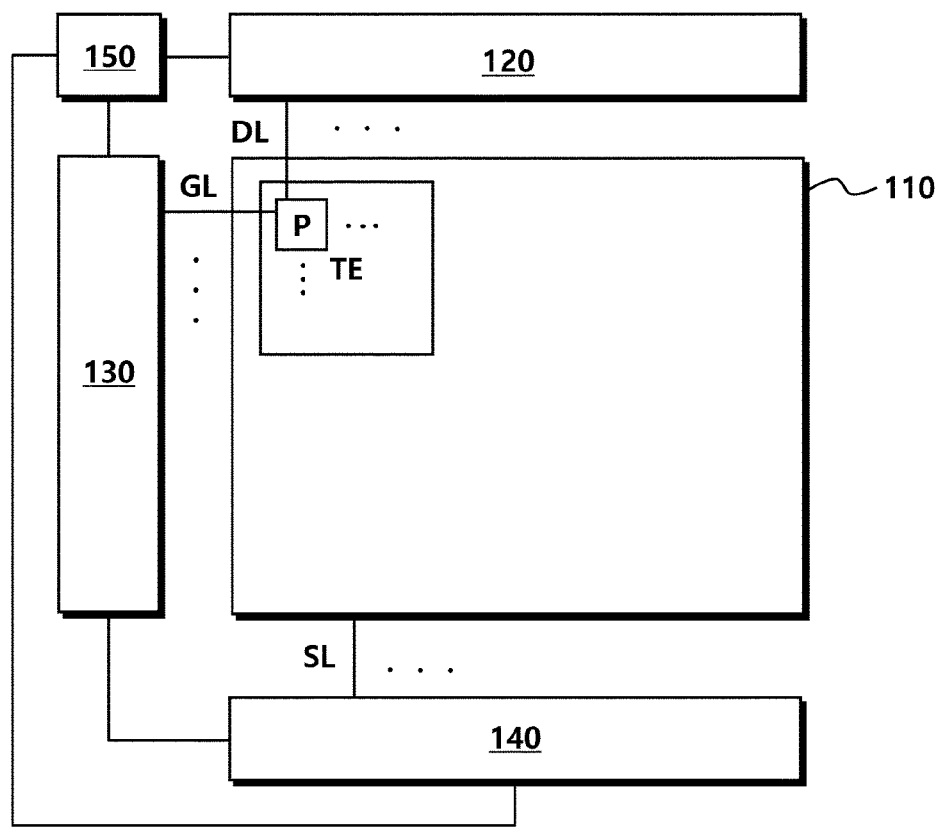
FIG. 1 is a configuration diagram of a display device in accordance with an embodiment.

FIG. 1 is a configuration diagram of a display device in accordance with an embodiment.

Referring to FIG. 1, a display device 100 may include a panel 110, a data driving circuit 120, a gate driving circuit 130, a touch sensing circuit 140 and a control circuit 150.

A plurality of data lines DL which is connected to the data driving circuit 120 and a plurality of gate lines GL which is connected to the gate driving circuit 130 may be formed in the panel 110. A plurality of pixels P corresponding to intersections of the plurality of data lines DL and the plurality of gate lines GL may be defined in the panel 110.

In each pixel P, a transistor having a first electrode (e.g., a source electrode or a drain electrode) which is connected to the data line DL, a gate electrode which is connected to the gate line GL and a second electrode (e.g., a drain electrode or a source electrode) which is connected to a display electrode may be formed.

Further, a plurality of touch electrodes TE may be formed in the panel 110 to be separated from one another. One pixel P or a plurality of pixels P may be located in a region where the touch electrode TE is located.

The panel 110 may include a display panel and a touch screen panel (TSP), and the display panel and the touch screen panel may share some components. For example, the plurality of touch electrodes TE may be one component (for example, common electrodes to which a common voltage is applied) of the display panel and may also be one components (touch electrodes for sensing a touch) of the touch screen panel. Since some components of the display panel and the touch screen panel are shared, the panel 110 is also called an integrated panel, but the present disclosure is not limited thereto. Further, an in-cell type panel in which some components of a display panel and a touch screen panel are shared is known, but this is merely an embodiment of the panel 110 and panels to which the present disclosure may be applied are not limited to such an in-cell type panel.

The data driving circuit 120 supplies a data signal to the data line DL in order to display an image on each pixel P of the panel 110.

The data driving circuit 120 may include at least one data driver integrated circuit. The at least one data driver integrated circuit may be connected to a bonding pad of the panel 110 in a tape automated bonding (TAB) manner or a chip-on-glass (COG) manner, or may be directly formed in the panel 110. In some cases, the at least one data driver integrated circuit may be formed by being integrated into the panel 110. Further, the data driving circuit 120 may be implemented in a chip-on-film (COF) manner.

The gate driving circuit 130 sequentially supplies scan signals to the gate lines GL to turn on or off the transistors located in the respective pixels P.

Depending on a driving method, the gate driving circuit 130 may be located only on one side of the panel 110 as illustrated in FIG. 1 or may be divided into two gate driving circuits which are located on both sides, respectively, of the panel 110.

The gate driving circuit 130 may include at least one gate driver integrated circuit. The at least one gate driver integrated circuit may be connected to a bonding pad of the panel 110 in the tape automated bonding (TAB) manner or the chip-on-glass (COG) manner, or may be directly formed in the panel 110 by being implemented in a gate-in-panel (GIP) manner. In some cases, the at least one gate driver integrated circuit may be formed by being integrated into the panel 110. Further, the gate driving circuit 130 may be implemented in the chip-on-film (COF) manner.

The touch sensing circuit 140 applies driving signals to all or some of a plurality of touch electrodes TE which is connected to sensing lines SL.

As illustrated in FIG. 1, the touch sensing circuit 140 may be disposed outside the data driving circuit 120 and the gate driving circuit 130 as a component separate from the data driving circuit 120 and the gate driving circuit 130. However, depending on an implementation scheme, the touch sensing circuit 140 may be implemented as an internal component of another separate driver integrated circuit including at least one of the data driving circuit 120 and the gate driving circuit 130, or may be implemented as an internal component of the data driving circuit 120 or the gate driving circuit 130.

Accordingly, the application of driving signals to all or some of the plurality of touch electrodes TE by the touch sensing circuit 140 may be considered as the application of driving signals to all or some of the plurality of touch electrodes TE by the separate driver integrated circuit including the touch sensing circuit 140. Further, depending on a design scheme, the application of driving signals to all or some of the plurality of touch electrodes TE by the touch sensing circuit 140 may be considered as the application of driving signals to all or some of the plurality of touch electrodes TE by the data driving circuit 120 or the gate driving circuit 130 including the touch sensing circuit 140.

Such a touch sensing circuit 140 is not limited to the above-described implementation and design schemes, and may be another component itself or may be a component which is located inside or outside the other component, so long as a function the same as or similar to that described in the present specification is performed.

Further, although FIG. 1 illustrates that one touch sensing circuit 140 is located in the display device 100, the display device 100 may include two or more touch sensing circuits 140.

In order for the touch sensing circuit 140 to supply the driving signals to all or some of the plurality of touch electrodes TE, the sensing lines SL which are connected to the plurality of touch electrodes TE, respectively, are required. Accordingly, the sensing lines SL connected to the plurality of touch electrodes TE, respectively, to transfer the driving signals may be formed in a first direction (e.g., a vertical direction) or a second direction (e.g., a horizontal direction) in the panel 110.

The display device 100 may adopt a capacitive touch type of recognizing a proximity or touch of an object by sensing a change in capacitance through the touch electrode TE.

The capacitive touch type may be divided into, for example, a mutual capacitive touch type and a self-capacitive touch type.

In the mutual capacitive touch type as a kind of capacitive touch type, a driving signal is applied to one touch electrode (a Tx electrode), and the other touch electrode (an Rx electrode) coupled to the Tx electrode is sensed. In such a mutual capacitive touch type, a value sensed in the Rx electrode may vary depending on a proximity or touch of an object such as a finger or a pen, and the presence or absence of the touch and touch coordinates are detected using the value sensed in the Rx electrode.

In the self-capacitive touch type as another kind of capacitive touch type, a driving signal is applied to one touch electrode TE, and then, the corresponding one touch electrode TE is sensed. In such a self-capacitive touch type, a value sensed in the corresponding one touch electrode TE may vary depending on a proximity or touch of an object such as a finger or a pen, and the presence or absence of the touch and touch coordinates are detected using the sensing value. In the self-capacitive touch type, a touch electrode TE for applying a driving signal and a touch electrode TE to be sensed are the same as each other, and thus, there is no distinction between a Tx electrode and an Rx electrode.

The display device 100 may adopt one of the above-described two capacitive touch types (the mutual capacitive touch type and the self-capacitive touch type). In the present specification, however, an embodiment will be described on the assumption that the self-capacitive touch type is adopted, for the sake of convenience in explanation.

The display device 100 may drive the touch electrode TE by distinguishing between a display period and a touch period. For example, the touch sensing circuit 140 of the display device 100 may not apply driving signals to all or some of the touch electrodes TE during a period in which data signals are supplied.

Furthermore, the display device 100 may drive the touch electrode TE without distinguishing between a display period and a touch period. For example, the touch sensing circuit 140 of the display device 100 may apply driving signals to all or some of the touch electrodes TE during a period in which data signals are supplied.

The control circuit 150 may supply various control signals to the data driving circuit 120, the gate driving circuit 130 and the touch sensing circuit 140. The control circuit 150 may transmit a data control signal (DCS) which controls the data driving circuit 120 to supply a data voltage to each pixel P, transmit a gate control signal (GCS) to the gate driving circuit 130 or transmit a sensing signal to the touch sensing circuit 140, in conformity with each timing. The control circuit 150 may be a timing controller (T-Con) or may include a timing controller to further perform other control functions.

Figure 2:
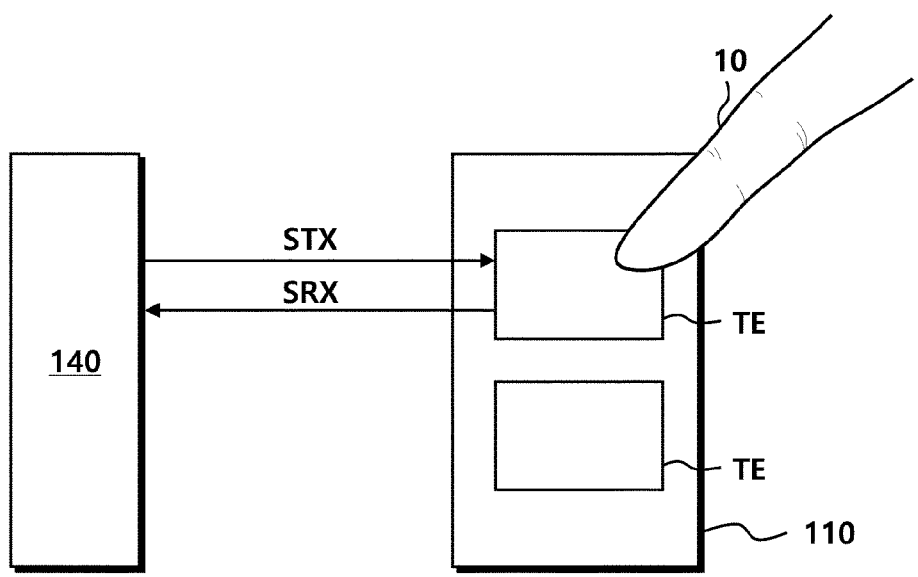
FIG. 2 is a diagram to assist in the explanation of a touch sensing process in accordance with an embodiment.

FIG. 2 is a diagram to assist in the explanation of a touch sensing process in accordance with an embodiment.

Referring to FIG. 2, a touch sensing system 200 may include a panel 110 and a touch sensing circuit 140.

A plurality of touch electrodes TE may be disposed in the panel 110.

The touch sensing circuit 140 may supply a driving signal STX to the touch electrode TE. The driving signal STX may be a signal in the form of a voltage or a current. The driving signal STX in the form of a voltage may be defined as a driving voltage. The driving signal STX may include one driving cycle consisting of a first period and a second period.

The touch sensing circuit 140 may receive a response signal SRX to the driving signal STX from the touch electrode TE, and may sense a touch or proximity of an object 10 to the panel 110 by demodulating the response signal SRX. The response signal SRX may be a signal in the form of a current or a voltage.

Figure 3:
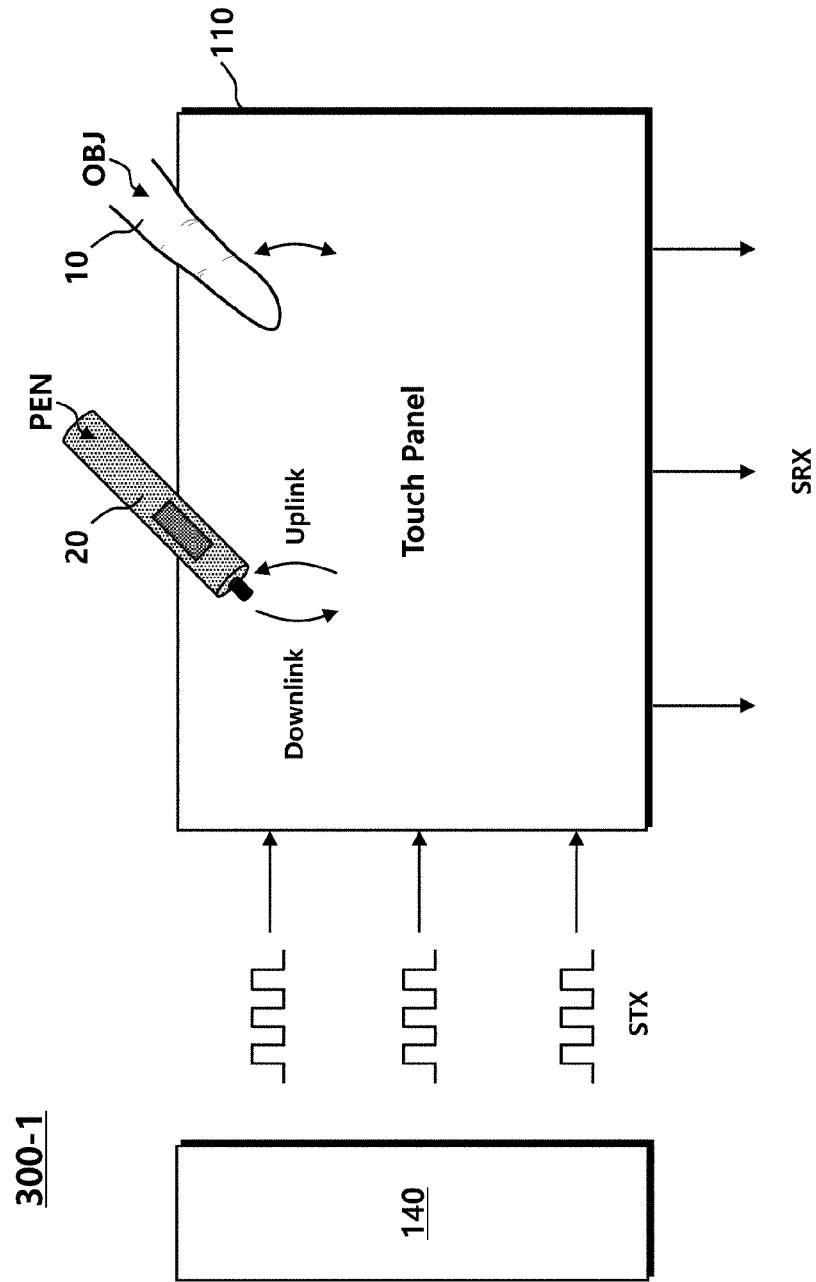
FIG. 3 is a diagram to assist in the explanation of processes for sensing touches of a stylus pen and a finger in accordance with an embodiment.

FIG. 3 is a diagram to assist in the explanation of processes for sensing touches of a stylus pen and a finger in accordance with an embodiment.

Referring to FIG. 3, in a touch sensing system 300-1, a display device 100, a touch panel 110 or a touch sensing circuit 140 may transmit an uplink (UL) signal to an object, for example, a stylus pen 20 or a finger 10.

A driving circuit (not illustrated) of the touch sensing circuit 140 may transmit the uplink signal to the stylus pen 20 through a touch electrode. When the stylus pen 20 touches or approaches, within a preset distance, the touch panel 110 including the touch electrode, the stylus pen 20 may receive the uplink signal. The uplink signal may be transmitted to the stylus pen 20 from a part or the entirety of the touch panel 110.

The uplink signal transmitted from the touch sensing circuit 140 to the stylus pen 20 may include information on the touch panel 110 (e.g., state information of the touch panel 110, identification information of the touch panel 110 and type information of the touch panel 110), information on a driving mode of the touch panel 110 (e.g., identification information of a stylus pen search mode and a stylus pen driving mode), information on characteristic information of a stylus pen signal (e.g., a driving frequency of the touch panel 110, a transmission frequency of the stylus pen 20 and the number of pulses of a signal).

A sensing circuit (not illustrated) of the touch sensing circuit 140 may receive a downlink (DL) signal through a touch electrode from the stylus pen 20. When the stylus pen 20 receives the uplink signal, the stylus pen 20 may transmit the downlink signal. The downlink signal may be transmitted to a touch electrode which is located at a point touched or approached by the stylus pen 20.

If the downlink signal is received by the touch sensing circuit 140, the touch sensing circuit 140 may continuously exchange data with the stylus pen 20. If the downlink signal is not received by the touch sensing circuit 140 from a certain time point, the touch sensing circuit 140 may search for an active pen again. That is to say, the touch sensing circuit 140 may repeat the above process by transmitting the uplink signal again to the stylus pen 20.

The touch sensing circuit 140 may determine the presence or absence of a touch, a touch position, a touch intensity, a touch interval, etc. depending on a change in the capacitance of a touch electrode according to a touch or approach of an object.

The touch sensing circuit 140 may receive the downlink signal which is generated by the stylus pen 20 itself, regardless of information according to a touch or approach of an object.

The downlink signal may include information on a state of the stylus pen 20 (e.g., power information of the stylus pen 20, frequency information of the stylus pen 20, protocol information of the stylus pen 20 and information on a moving speed, a position and a slope of the stylus pen 20).

The downlink signal transmitted by the stylus pen 20 may adopt a frequency different from that of a driving signal. The frequency of the downlink signal may be adopted in consideration of information on a state of the stylus pen 20 in a processor (not illustrated) or a frequency selection circuit (not illustrated) in the stylus pen 20.

Figure 4:
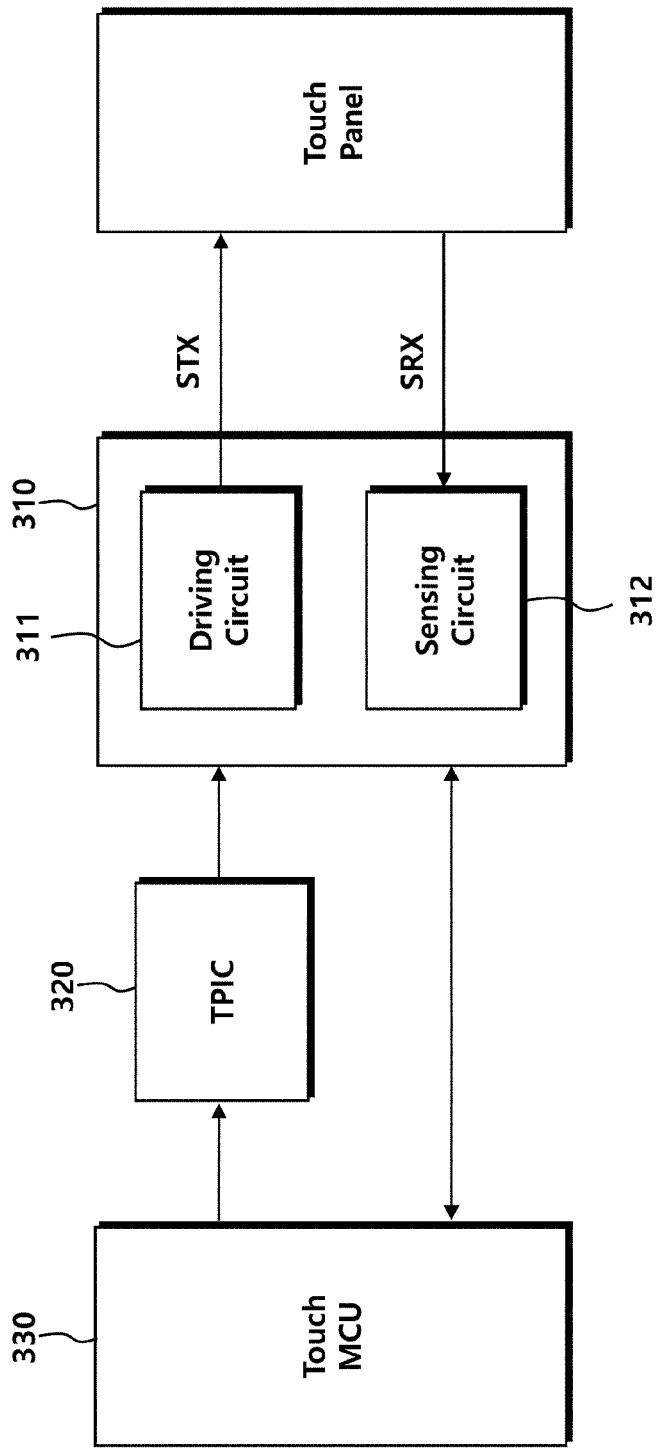
FIG. 4 is a configuration diagram of a touch sensing circuit in accordance with an embodiment.

FIG. 4 is a configuration diagram of a touch sensing circuit in accordance with an embodiment.

Referring to FIG. 4, a touch sensing circuit 140 may include a readout circuit 310, a touch power circuit 320 and a touch control circuit 330.

The readout circuit 310 may supply a driving signal STX, for example, a driving voltage, having a preset amplitude to a touch electrode. A driving circuit 311 included in the readout circuit 310 may receive a control signal for changing an amplitude, from the touch control circuit 330, and may transmit the driving signal STX which has a changed amplitude. A sensing circuit 312 included in the readout circuit 310 may receive a response signal SRX to the driving signal STX from the touch electrode, and thereby, may sense a touch or a proximity of an external object to a panel. The sensing circuit 312 may generate touch sensing data, for example, a touch sensing value, by demodulating the response signal SRX.

The driving signal STX and the response signal SRX of the readout circuit 310 may be square wave signals or sine wave signals.

The touch power circuit 320 may generate various power signals including a reference voltage signal and a driving voltage required for driving the panel, and may supply the various power signals to the readout circuit 310 and the touch control circuit 330. If necessary, the touch power circuit 320 may be defined as a touch power integrated circuit (TPIC).

The touch control circuit 330 may generate a control signal (CS) in order to control the readout circuit 310 and the touch power circuit 320. When the touch control circuit 330 transmits the control signal (CS) to the readout circuit 310 and the touch power circuit 320, the driving circuit 311 and the sensing circuit 312 may operate according to the control signal (CS). If necessary, the touch control circuit 330 may be defined as a micro controller unit (MCU).

Figure 5:
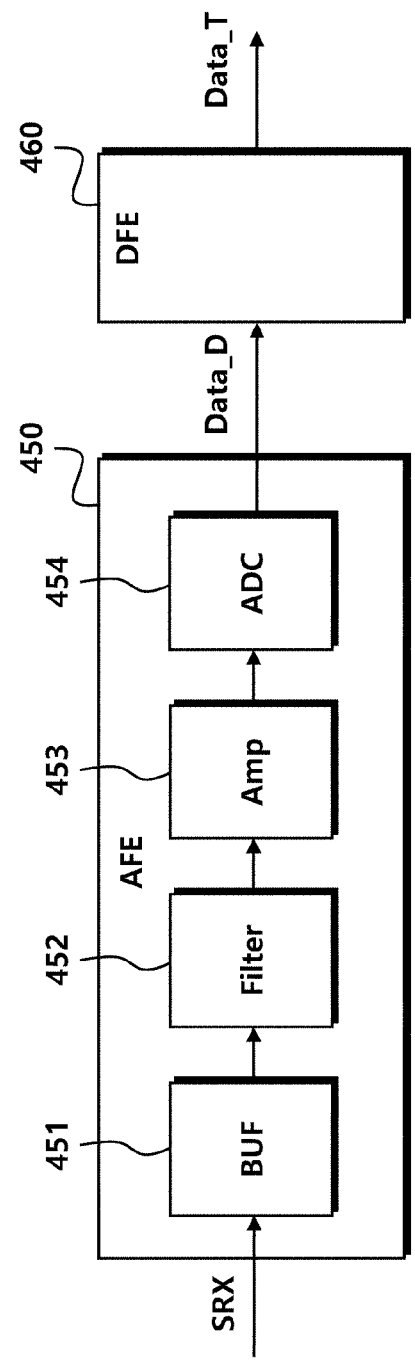
FIG. 5 is a configuration diagram of a readout circuit in accordance with an embodiment.

FIG. 5 is a configuration diagram of a readout circuit in accordance with an embodiment.

Referring to FIG. 5, the sensing circuit 312 of the readout circuit 310 may include an analog signal processing circuit 450 and a digital signal processing circuit 460 in order to process a received sensing signal SRX. If necessary, the analog signal processing circuit 450 may be defined as an analog front end (AFE), and the digital signal processing circuit 460 may be defined as a digital front end (DFE).

The analog signal processing circuit 450 may include a buffer 451, a filter 452, an amplifier 453 and an analog-to-digital converter (ADC) 454.

The buffer 451 may perform an operation of receiving the sensing signal SRX. For example, the buffer 451 may receive the sensing signal SRX in a current form and transfer the sensing signal SRX to the filter 452 without any change, or may receive the sensing signal SRX in a capacitance form, convert the sensing signal SRX into a signal in a current form, and may transfer the converted signal to the filter 452. Furthermore, the buffer 451 may receive the sensing signal SRX in a current form, and may generate an output signal by converting the sensing signal SRX into a signal in a voltage form.

The buffer 451 may form a single buffer which processes a single input signal, or may include differential input buffers which receive two or more input signals.

The filter 452 may remove or reduce frequency bands caused due to noise among frequencies of sensing signals. For example, the filter 452 may be a band pass filter which has a pass band and a stop band based on a cutoff frequency. The filter 452 may include at least one high pass filter or at least one low pass filter. If necessary, a filter system may be formed by a combination of at least one high pass filter and at least one low pass filter.

The sensing signal SRX may include a plurality of signals which have different frequencies, and may include signals of frequency bands caused due to noise. By the filter 452, a noise signal of a preset frequency band may be removed or reduced, and more accurate touch sensing data may be obtained.

The amplifier 453 may generate an analog amplification signal by amplifying an output signal of the filter 452.

The analog-to-digital converter 454 may generate digital data Data_D through analog-to-digital conversion for the analog amplification signal.

The sequence and disposition of the buffer 451, the filter 452, the amplifier 453 and the analog-to-digital converter 454 of the analog signal processing circuit 450 are not limited to the form illustrated in FIG. 5, and may have other various forms.

Figure 6:
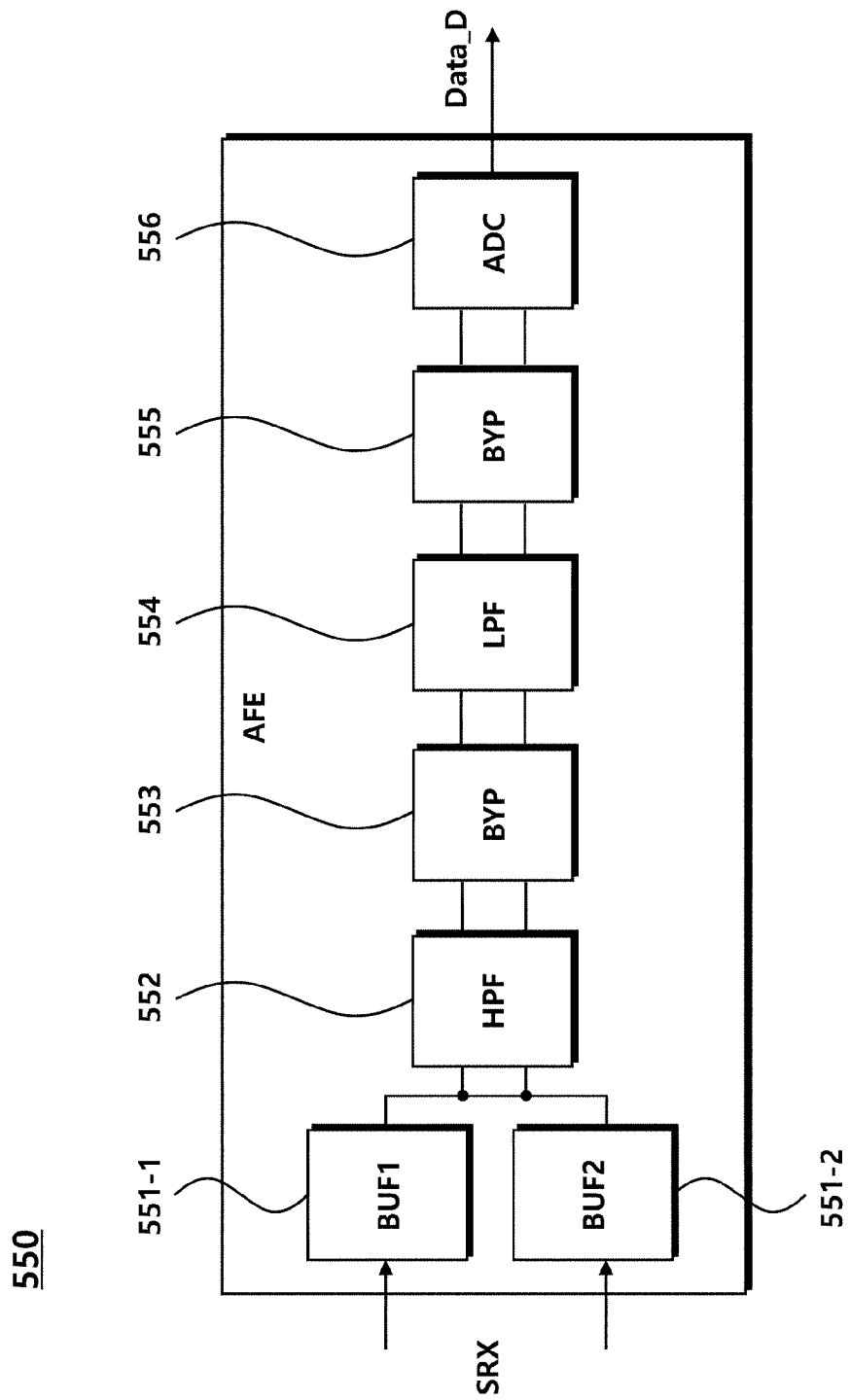
FIG. 6 is a diagram illustrating the configuration of a first example of an analog signal processing circuit in accordance with an embodiment.

FIG. 6 is a diagram illustrating the configuration of a first example of an analog signal processing circuit in accordance with an embodiment.

Referring to FIG. 6, an analog signal processing circuit 550 may include a first buffer 551-1, a second buffer 551-2, a high pass filter 552, a first bypass circuit 553, a low pass filter 554, a second bypass circuit 555 and an analog-to-digital converter 556.

The first buffer 551-1 and the second buffer 551-2 may receive a plurality of sensing signals SRX and process the received sensing signals SRX in a differential manner.

Each of the first buffer 551-1 and the second buffer 551-2 may convert a signal related to a change in the capacitance of a touch electrode, into a signal related to a current, and may output the converted signal. The outputted signal related to a current may be transferred to the high pass filter 552.

The signal related to a current, processed by each of the first buffer 551-1 and the second buffer 551-2, may pass through the high pass filter 552, the first bypass circuit 553 and the low pass filter 554, which makes it possible to remove or reduce noise in a frequency range having a preset band.

A signal passed through the second bypass circuit 555 and the analog-to-digital converter 556 may be converted into digital data Data_D.

The sensing signal SRX received by the analog signal processing circuit 550 may be a sensing signal by a finger touch or a stylus pen touch, and the digital data Data_D converted by the analog signal processing circuit 550 may be transferred to a digital signal processing circuit (not illustrated).

The sequence and disposition of the first buffer 551-1, the second buffer 551-2, the high pass filter 552, the first bypass circuit 553, the low pass filter 554, the second bypass circuit 555 and the analog-to-digital converter 556 of the analog signal processing circuit 550 are not limited to the form illustrated in FIG. 6, and may have other various forms by omitting or incorporating some circuits.

Figure 7:
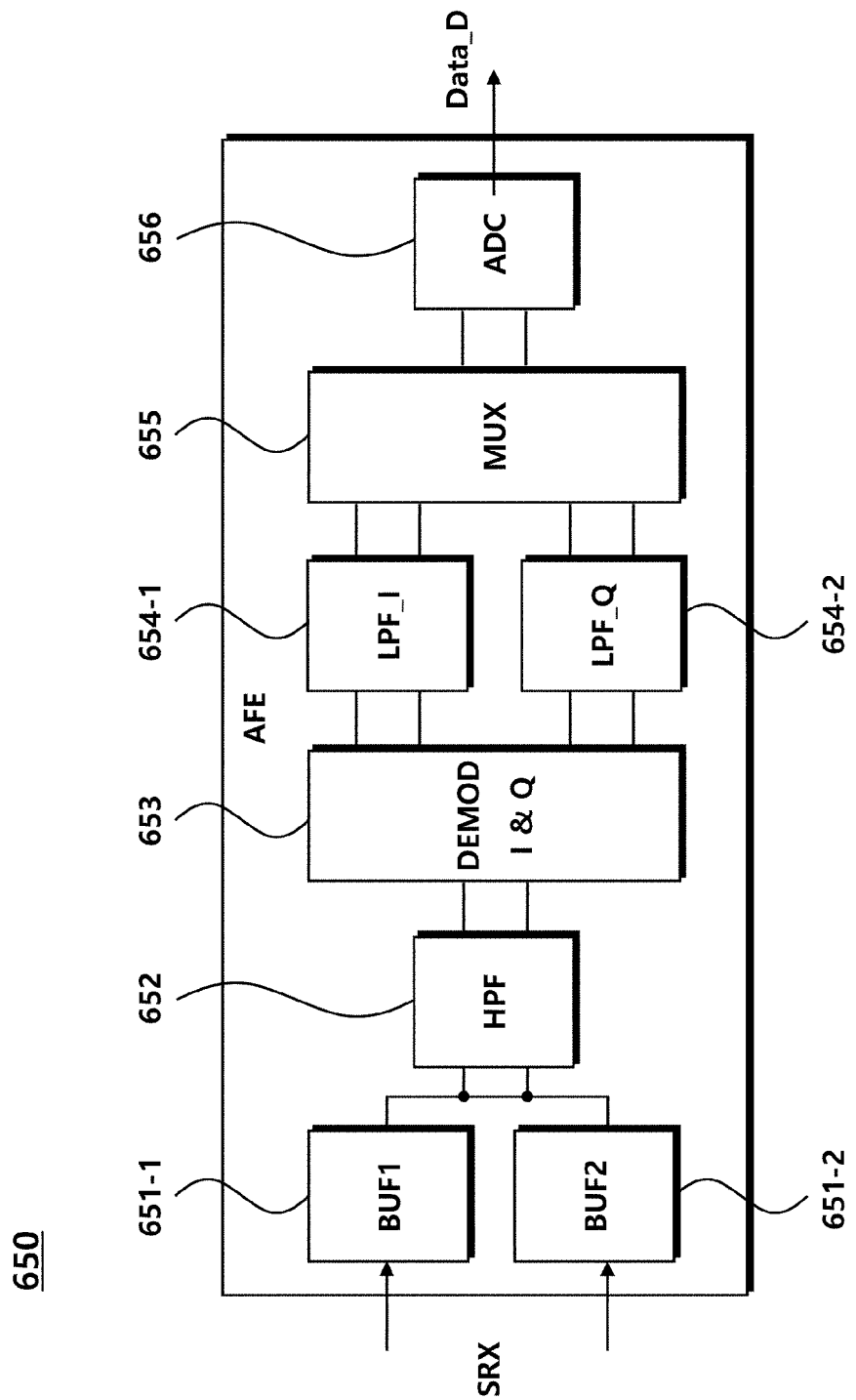
FIG. 7 is a diagram illustrating the configuration of a second example of the analog signal processing circuit in accordance with the embodiment.

FIG. 7 is a diagram illustrating the configuration of a second example of the analog signal processing circuit in accordance with the embodiment.

Referring to FIG. 7, an analog signal processing circuit 650 may include a first buffer 651-1, a second buffer 651-2, a high pass filter 652, a demodulation circuit 653, a first low pass filter 654-1, a second low pass filter 654-2, a MUX 655 and an analog-to-digital converter 656.

The first buffer 651-1 and the second buffer 651-2 may receive a plurality of sensing signals SRX and transfer the plurality of sensing signals SRX to the high pass filter 652, and may remove or reduce noise below a cutoff frequency.

The demodulation circuit 653 may process a signal by an IQ demodulation (in-phase and quadrature demodulation) scheme, and may convert a received signal into a signal having a desired amplitude, phase and frequency.

The signal demodulated by the demodulation circuit 653 may be transferred to the analog-to-digital converter 656 through the first low pass filter 654-1, and may be transferred to the analog-to-digital converter 656 through the second low pass filter 654-2.

The MUX 655 may select a signal passed through the first low pass filter 654-1 or a signal passed through the second low pass filter 654-2 and generate the selected signal as an output. Without a limiting sense, the signal passed through the first low pass filter 654-1 may be defined as an I signal, and the signal passed through the second low pass filter 654-2 may be defined as a Q signal.

The MUX 655 may alternately receive and output the I signal and the Q signal. If necessary, the MUX 655 may be defined as a multiplexer.

The analog-to-digital converter 656 may convert the analog signal selected by the MUX 655 into a digital signal and output the digital signal.

The sensing signal SRX received by the analog signal processing circuit 650 may be a sensing signal by a stylus pen touch, and digital data Data_D converted by the analog signal processing circuit 650 may be transferred to a digital signal processing circuit (not illustrated).

The sequence and disposition of the first buffer 651-1, the second buffer 651-2, the high pass filter 652, the demodulation circuit 653, the first low pass filter 654-1, the second low pass filter 654-2, the MUX 655 and the analog-to-digital converter 656 of the analog signal processing circuit 650 are not limited to the form illustrated in FIG. 7, and may have other various forms by omitting or incorporating some circuits.

Figure 8:
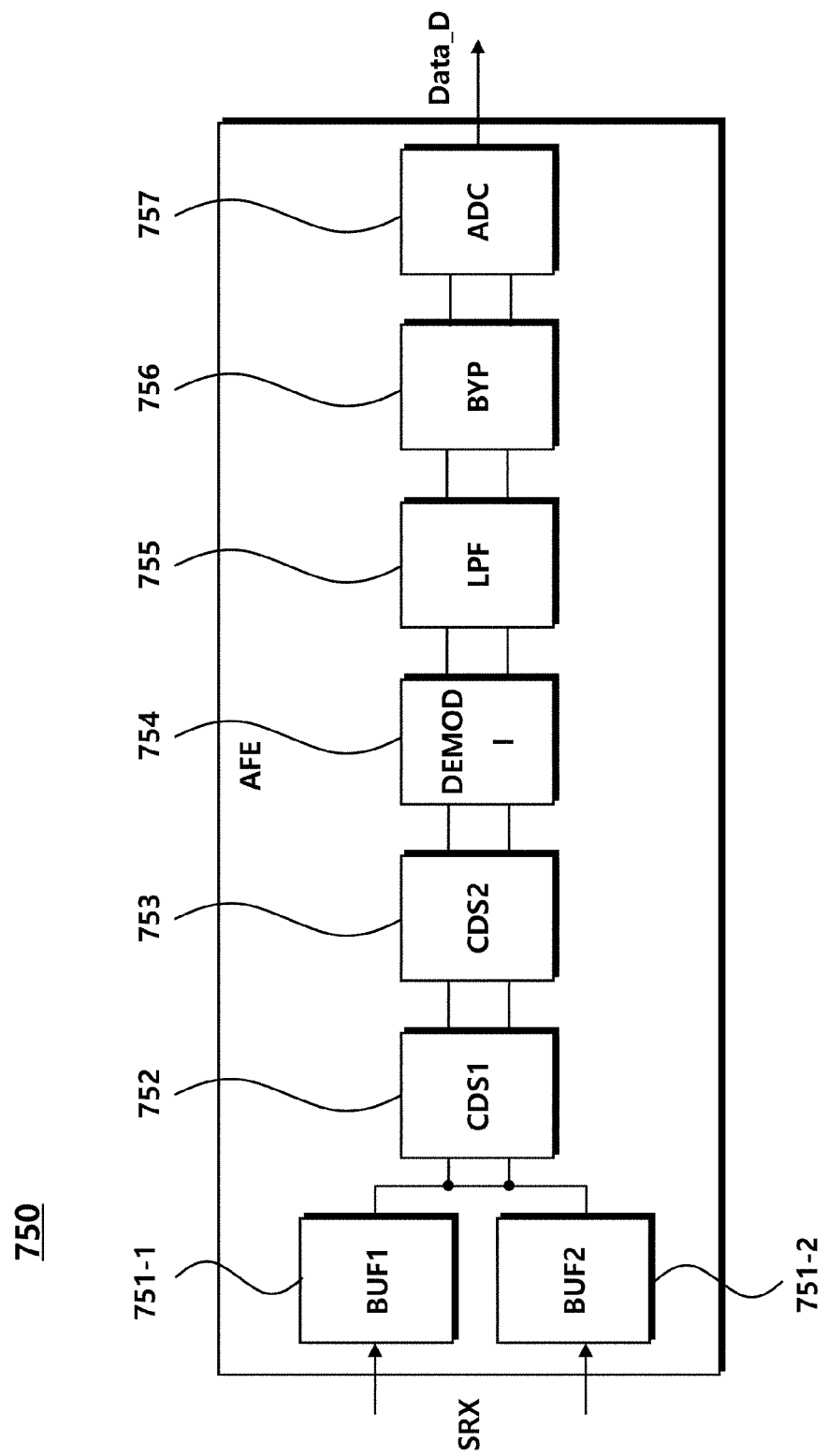
FIG. 8 is a diagram illustrating the configuration of a third example of the analog signal processing circuit in accordance with the embodiment.

FIG. 8 is a diagram illustrating the configuration of a third example of the analog signal processing circuit in accordance with the embodiment.

Referring to FIG. 8, an analog signal processing circuit 750 may include a first buffer 751-1, a second buffer 751-2, a first correlated double sampling circuit 752, a second correlated double sampling circuit 753, a demodulation circuit 754, a low pass filter 755, a bypass circuit 756 and an analog-to-digital converter 757.

Each of the first buffer 751-1 and the second buffer 751-2 may process a sensing signal SRX received from a touch panel and transfer a processed signal to the first correlated double sampling circuit 752.

A polarity of a signal may be converted or sampled through a correlated double sampling circuit (CDS). If necessary, the correlated double sampling circuit may include an integrator.

The first correlated double sampling circuit 752 and the second correlated double sampling circuit 753 may be continuously disposed to sample and sense a polarity change when a signal having a positive value and a signal having a negative value are repeated.

The demodulation circuit 754 may demodulate a current signal and output a demodulated signal, and may pass, through the low pass filter 755, a frequency signal having a frequency band equal to or less than a cutoff frequency as a reference.

A signal passed through the bypass circuit 756 and the analog-to-digital converter 757 may be converted into digital data Data_D.

The sensing signal SRX received by the analog signal processing circuit 750 may be a sensing signal by a finger touch, and the digital data Data_D converted by the analog signal processing circuit 750 may be transferred to a digital signal processing circuit (not illustrated).

Figure 9:
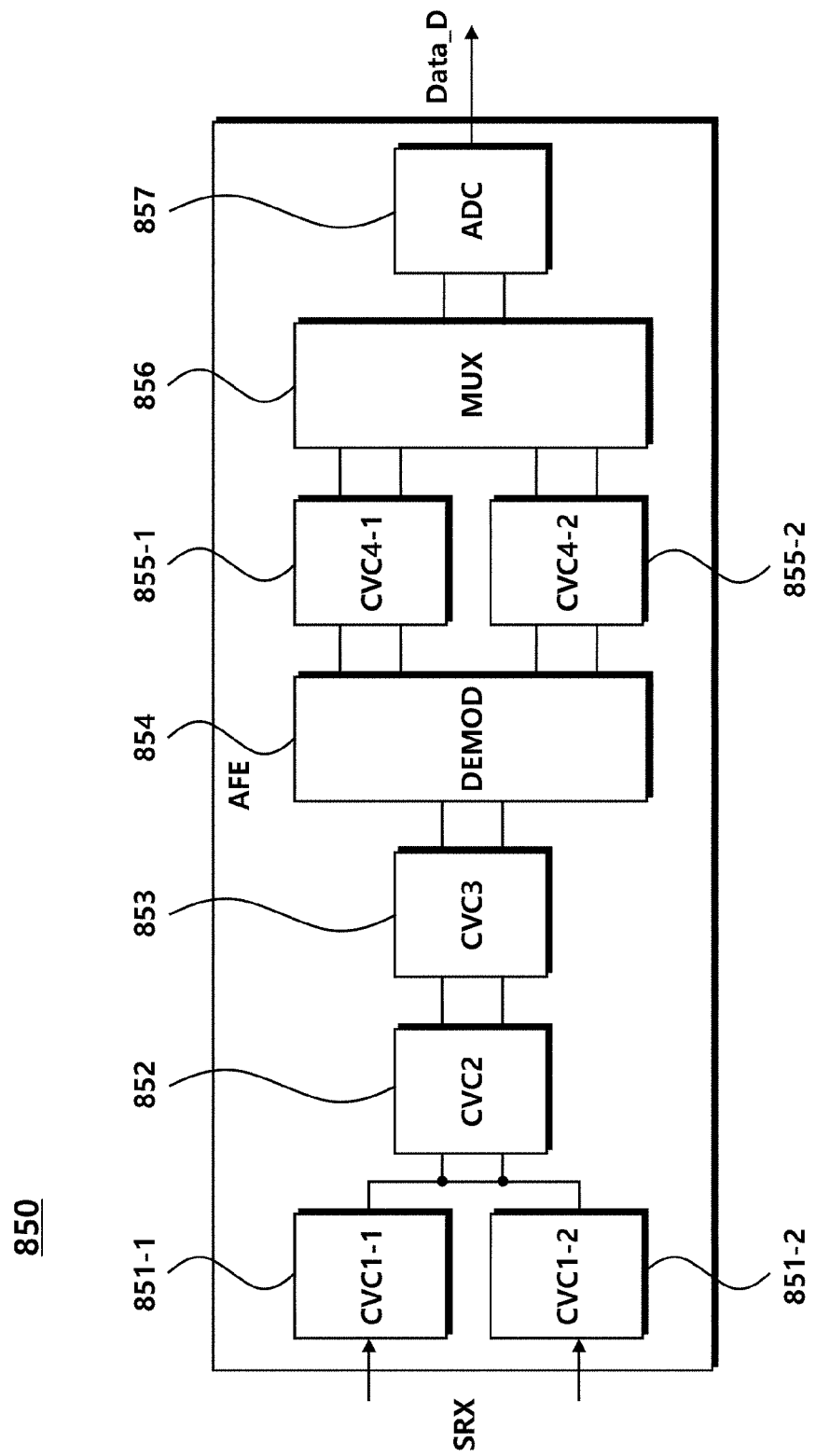
FIG. 9 is a diagram illustrating the configuration of a fourth example of the analog signal processing circuit in accordance with the embodiment.

FIG. 9 is a diagram illustrating the configuration of a fourth example of the analog signal processing circuit in accordance with the embodiment.

Referring to FIG. 9, an analog signal processing circuit 850 may include first current voltage control circuits 851-1 and 851-2, a second current voltage control circuit 852, a third current voltage control circuit 853, a demodulation circuit 854, fourth current voltage control circuits 855-1 and 855-2, a MUX 856 and an analog-to-digital converter 857.

A current voltage control circuit (CVC) may include at least one switch, and a connection structure of the current voltage control circuit may be changed according to a control signal. The role and operation of each current voltage control circuit may be changed depending on a touch sensing type and a change in touch mode. The power consumption of a display device may be reduced by changing a role of an integrated circuit without forming a separate circuit, and power consumption for each touch mode may be checked and adjusted. A circuit change of a current voltage control circuit (CVC) may be determined according to set values of a variable resistor and a variable capacitor.

Each of the first current voltage control circuits 851-1 and 851-2 may be a buffer, and may convert a signal related to a change in capacitance sensed in a touch panel into a signal related to a current and output the converted signal.

The second current voltage control circuit 852 may be a correlated double sampling circuit (CDS), and if necessary, may be a high pass filter.

The third current voltage control circuit 853 may be a correlated double sampling circuit (CDS), and if necessary, may be a bypass filter.

The demodulation circuit 854 may process an I signal and a Q signal to demodulate a stylus pen touch signal, but may process only an I signal to demodulate a finger touch signal. If necessary, the demodulation circuit 854 may serve as a bypass circuit.

Each of the fourth current voltage control circuits 855-1 and 855-2 may be a low pass filter, if necessary. According to a type of a touch, at least one low pass filter may be switched to an OFF state or a range of a cutoff frequency may be adjusted.

The MUX 856 may selectively output signals transferred from the fourth current voltage control circuits 855-1 and 855-2. The MUX 856 may receive a plurality of input signals and sequentially sense and output the plurality of input signals. However, when receiving one input signal, the MUX 856 may serve as a bypass circuit.

The analog-to-digital converter 857 may process an analog signal, convert the analog signal into a digital signal and output the digital signal.

The analog signal processing circuit 850 illustrated in FIG. 9 may form one integrated circuit, and may be changed to the role and operation of each of the analog signal processing circuits illustrated in FIGS. 6 to 8. For example, the second current voltage control circuit 852 and the fourth current voltage control circuits 855-1 and 855-2 may adjust a range of a frequency to be received, by changing a variable related to a variable resistor or a variable capacitor.

A circuit role and an operation change of the analog signal processing circuit 850 may be controlled by a touch control circuit (not illustrated), and may be controlled according to a change in a touch mode of a digital signal processing circuit (not illustrated).

Figure 10:
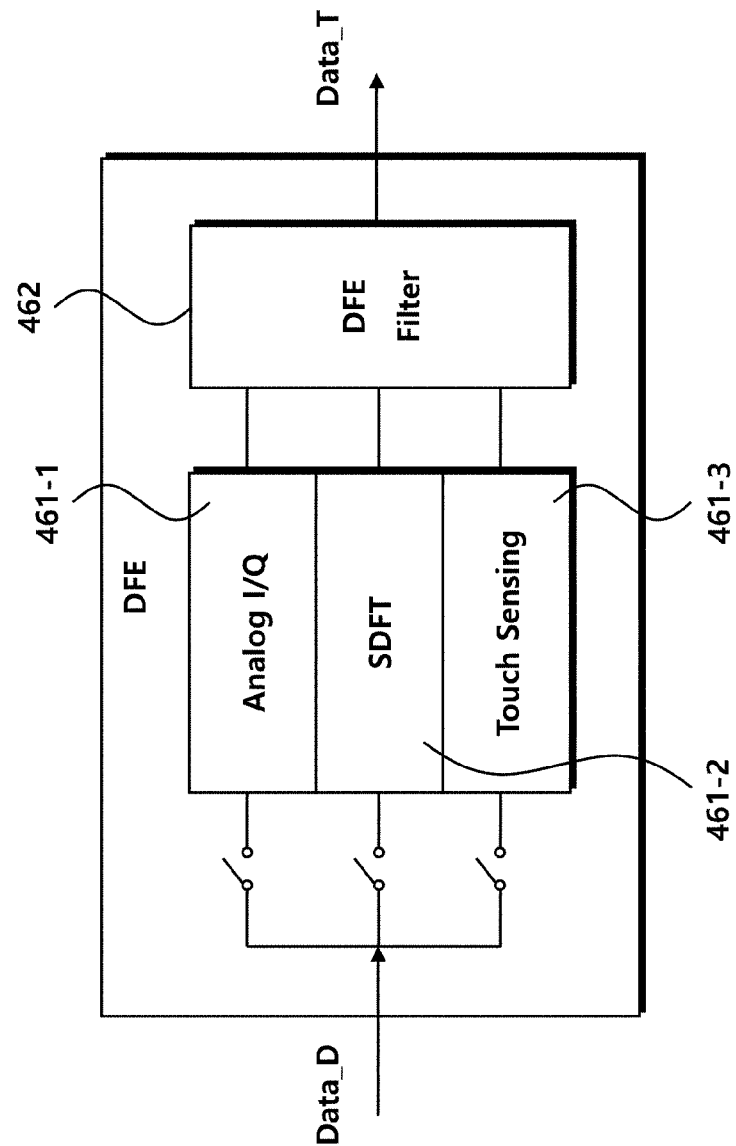
FIG. 10 is a diagram illustrating the configuration of a digital signal processing circuit in accordance with an embodiment.

FIG. 10 is a diagram illustrating the configuration of a digital signal processing circuit in accordance with an embodiment.

Referring to FIG. 10, the digital signal processing circuit 460 may include an analog IQ signal processing circuit 461-1, a sliding discrete Fourier transform signal processing circuit 461-2, a touch sensing signal processing circuit 461-3 and a filter 462.

The digital signal processing circuit 460 may process the digital data Data_D converted by the analog signal processing circuit 450 and thereby convert the digital data Data_D into touch sensing data Data_T.

The analog IQ signal processing circuit 461-1 may receive an I signal or a Q signal processed by a demodulation circuit (not illustrated) and perform a digital conversion.

The sliding discrete Fourier transform signal processing circuit 461-2 may separately receive a plurality of frequencies using the discrete Fourier transform (DFT). The sliding discrete Fourier transform signal processing circuit 461-2 may perform a digital conversion on each signal in a separated frequency range. The sliding discrete Fourier transform (SDFT) may be used as a type of discrete Fourier transform (DFT).

The sliding discrete Fourier transform may be a method of separating and obtaining frequencies by changing orders of digital signals.

According to the sliding discrete Fourier transform, the order is changed in a set of sampling data of the digital signal processing circuit and another set of data may be formed. Since the change of order in a set of actually sampled data may bring an effect of obtaining a plurality of sets of data, this allows securing the efficiency in data calculation and reducing the memory use amount.

The touch sensing signal processing circuit 461-3 may perform a digital conversion on a touch sensing signal of a self-capacitive type or a mutual capacitive type.

The digital conversion mode selection of the analog IQ signal processing circuit 461-1, the sliding discrete Fourier transform signal processing circuit 461-2 and the touch sensing signal processing circuit 461-3 of the digital signal processing circuit 460 may be selected depending on a type of a touch input. For example, a digital conversion of a stylus pen sensing signal may be performed by the analog IQ signal processing circuit 461-1 or the sliding discrete Fourier transform signal processing circuit 461-2. For another example, a digital conversion of a finger sensing signal may be performed by the touch sensing signal processing circuit 461-3.

A digital processing scheme of the digital signal processing circuit 460 may be differently selected depending on a frequency range of an inputted analog signal.

The filter 462 may perform filtering of a converted digital signal. When a plurality of frequencies are separated, frequencies within a preset range may be obtained or removed by filtering.

Figure 11:
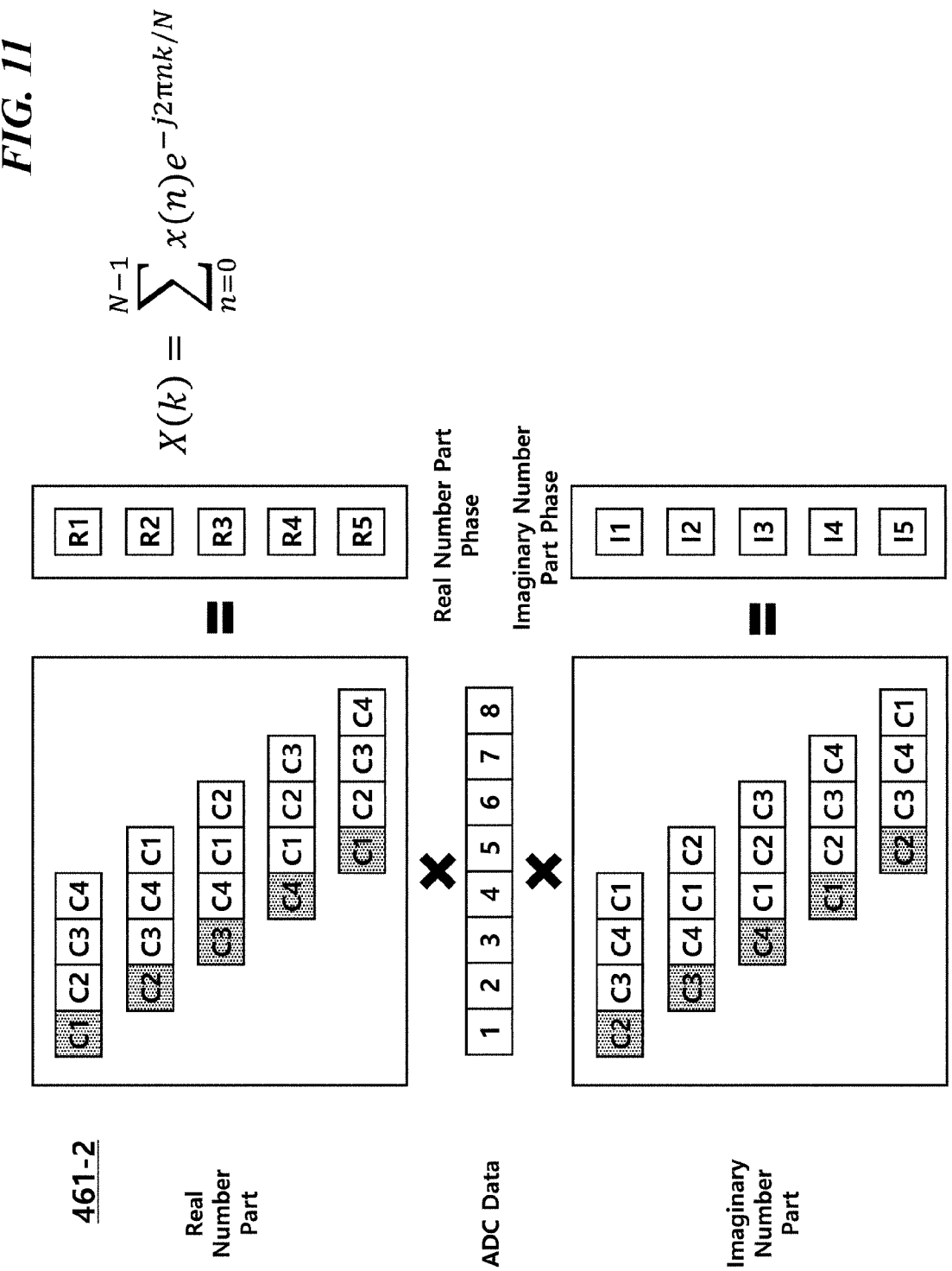
FIG. 11 is a diagram to assist in the explanation of a first example of a signal processing method of the digital signal processing circuit in accordance with the embodiment.

FIG. 11 is a diagram to assist in the explanation of a first example of a signal processing method of the digital signal processing circuit in accordance with the embodiment.

Referring to FIG. 11, a signal processing process performed by the sliding discrete Fourier transform signal processing circuit 461-2 may be seen.

The digital signal processing circuit 460 may receive a signal processed by the analog signal processing circuit 450 and perform a discrete Fourier transform (DFT). The analog signal processing circuit 450 may receive a first touch signal and a second touch signal in an analog form and convert them into a first touch digital signal and a second touch digital signal in a digital form.

The discrete Fourier transform may be to separate the first touch digital signal and the second touch digital signal based on their frequencies in a digital area.

The discrete Fourier transform (DFT) is a Fourier transform on a discrete input signal, and may receive and process signals for a plurality of frequencies. A fast Fourier transform (FFT) may be used as one method of the discrete Fourier transform (DFT).

By performing the discrete Fourier transform (DFT), it is possible to determine whether an input signal is included in a specific frequency range, and it is possible to determine the presence or absence and the type of each of a stylus pen touch and a finger touch.

Digital conversion may be performed by sequentially calculating signals inputted to the discrete Fourier transform (DFT).

$$X(k) = \sum_{n=0}^{N-1} x(n)e^{-j2\pi nk/N}$$

(X(k)=an output signal, x(n)=a continuous function, k=an input signal, n=an integer equal to or greater than 0 and N=an integer equal to or greater than 1)

By discretizing the continuous function of x(n), it is possible to define and use c(n) as a discrete Fourier transform (DFT) coefficient.

Since required capacity of a data memory increases depending on the number of data samplings, a sliding discrete Fourier transform may be performed to reduce the required capacity.

The discrete Fourier transform (DFT) coefficient may form another data set by changing the order of one sampling data set C1, C2, C3 and C4.

A discrete Fourier transform coefficient of a real number part may form, as data sets, a first real number part data set C1, C2, C3 and C4, a second real number part data set C2, C3, C4 and C1, a third real number part data set C3, C4, C1 and C2), a fourth real number part data set C4, C1, C2 and C3 and a fifth real number part data set C1, C2, C3 and C4. The real number part data sets may be defined as R1, R2, R3, R4 and R5, respectively.

A discrete Fourier transform coefficient of an imaginary number part may form, as data sets, a first imaginary number part data set C2, C3, C4 and C1, a second imaginary number part data set C3, C4, C1 and C2, a third imaginary number part data set C4, C1, C2 and C3, a fourth imaginary number part data set C1, C2, C3 and C4 and a fifth imaginary number part data set C2, C3, C4 and C1. The imaginary number part data sets may be defined as I1, I2, I3, I4 and I5, respectively.

The real number part data sets and the imaginary number part data sets may define a data set to correspond to 1, 2, 3, 4, 5, 6, 7 and 8 as analog-to-digital converter data.

Each of real number part data and imaginary number part data may include data regarding a phase.

Figure 12:
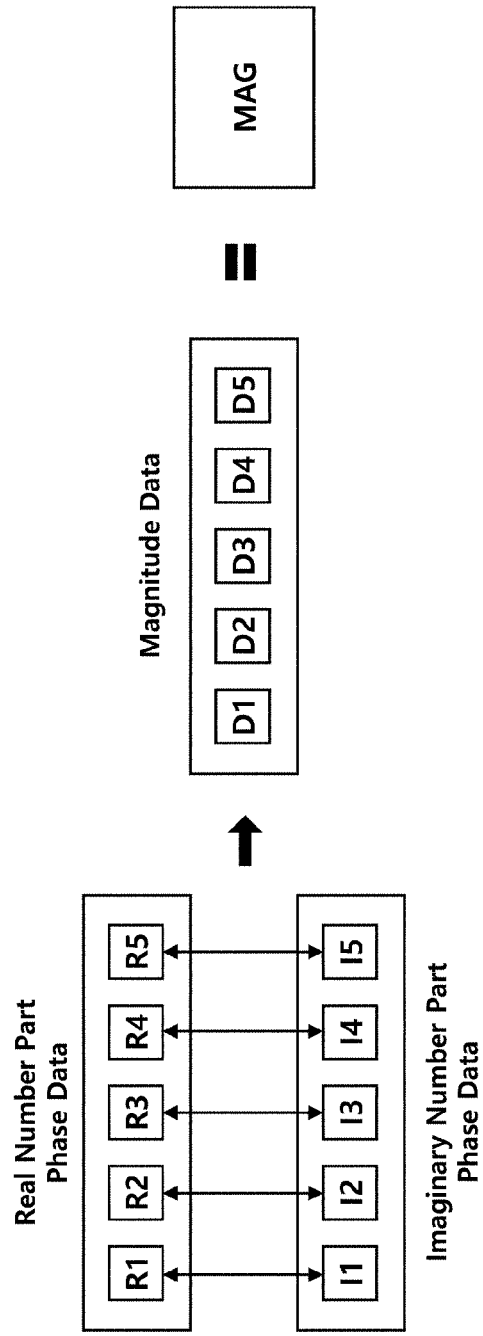
FIG. 12 is a diagram to assist in the explanation of a second example of the signal processing method of the digital signal processing circuit in accordance with the embodiment.

FIG. 12 is a diagram to assist in the explanation of a second example of the signal processing method of the digital signal processing circuit in accordance with the embodiment.

Referring to FIG. 12, a signal processing process performed by the sliding discrete Fourier transform signal processing circuit 461-2 may be seen.

A real number part data set and an imaginary number part data set may be defined as a real number part value and an imaginary number part value, respectively.

The real number part values R1, R2, R3, R4 and R5 may correspond to the imaginary number part values I1, I2, I3, I4 and I5, respectively, and may be calculated as root mean squares to generate magnitude data.

D1 may be calculated by taking the root mean square of the rear part value R1 and the imaginary number part value I1, and the same operation may be performed for D2 to D5. Final data MAG may be defined as an average value of D1 to D5.

Through the sliding discrete Fourier transform (SDFT), it is possible to extract high-accuracy data by a small number of data samplings.

The digital signal processing circuit 460 may separately sense multiple frequencies through the sliding discrete Fourier transform (SDFT).

Figure 13:
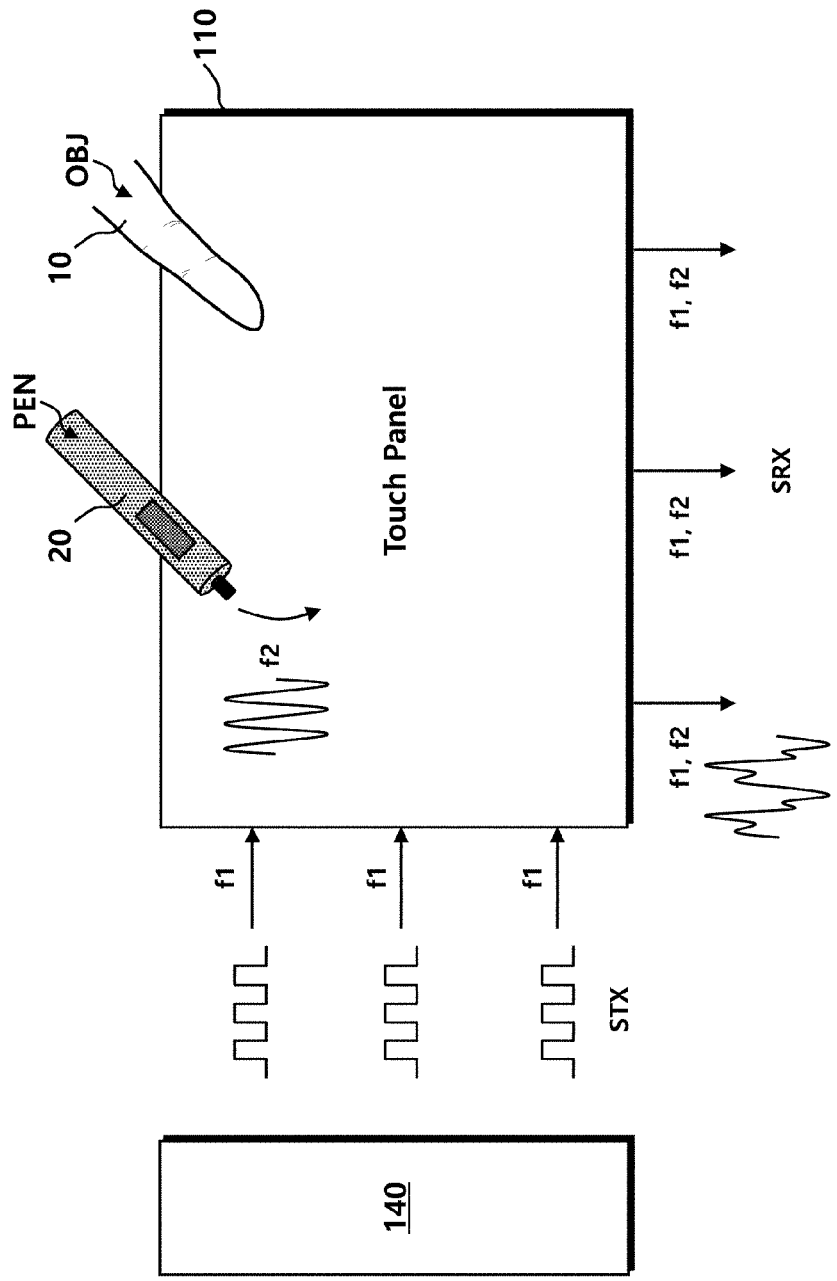
FIG. 13 is a diagram to assist in the explanation of processes for sensing touches of a stylus pen and a finger by using multi-frequency signals in accordance with an embodiment.

FIG. 13 is a diagram to assist in the explanation of processes for sensing touches of a stylus pen and a finger by using multi-frequency signals in accordance with an embodiment.

Referring to FIG. 13, a frequency of a driving signal STX transferred from a touch sensing circuit 140 may be a first frequency f1, and a frequency transmitted from a stylus pen 20 may be a second frequency f2.

When the stylus pen 20 and a finger 10 are simultaneously sensed in a touch sensing system 300-2, a panel 110 may transfer the sensing signal SRX including components of the first frequency f1 and the second frequency f2 to a readout circuit (not illustrated).

When the sensing signal SRX is sensed in a time-divided manner, the first frequency f1 and the second frequency f2 may be sensed during separate time periods, but when the sensing signal SRX is driven during the same time period, the first frequency f1 and the second frequency f2 may be simultaneously sensed by being mixed with each other.

Figure 14:
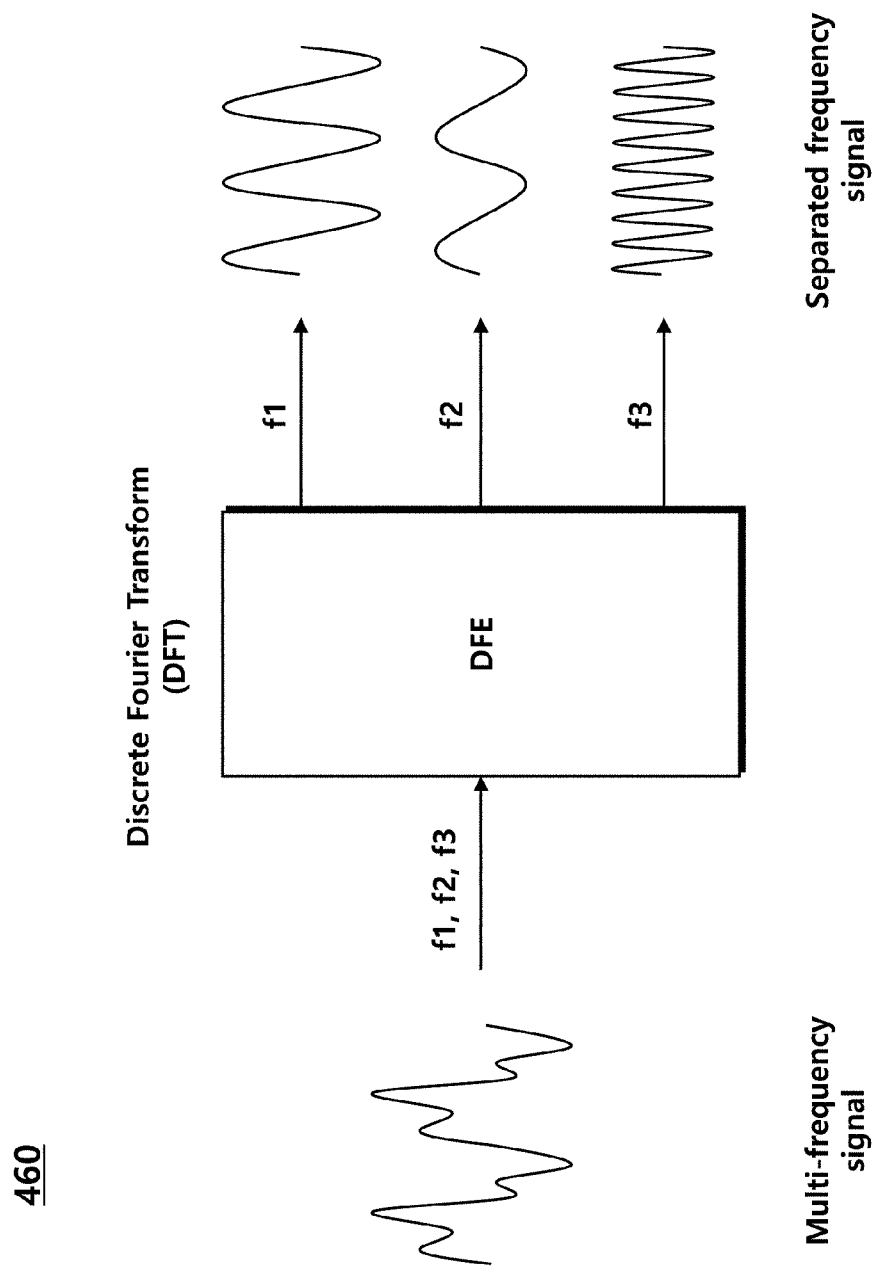
FIG. 14 is a diagram to assist in the explanation of a multi-frequency signal separation method of the digital signal processing circuit in accordance with the embodiment.

FIG. 14 is a diagram to assist in the explanation of a multi-frequency signal separation method of the digital signal processing circuit in accordance with the embodiment.

Referring to FIG. 14, the digital signal processing circuit (DFE) 460 may receive multi-frequency signals in which a first frequency f1, a second frequency f2 and a third frequency f3 are mixed, as an analog signal.

The digital signal processing circuit (DFE) 460 may separate respective frequency components of the received signals by performing the aforementioned discrete Fourier transform (DFT), and may separately output respective signals for separated frequency bands.

Determination of each frequency band may be performed by a filter (not illustrated).

By the discrete Fourier transform (DFT), frequency processing processes may be simultaneously performed during the same time period.

Figure 15:
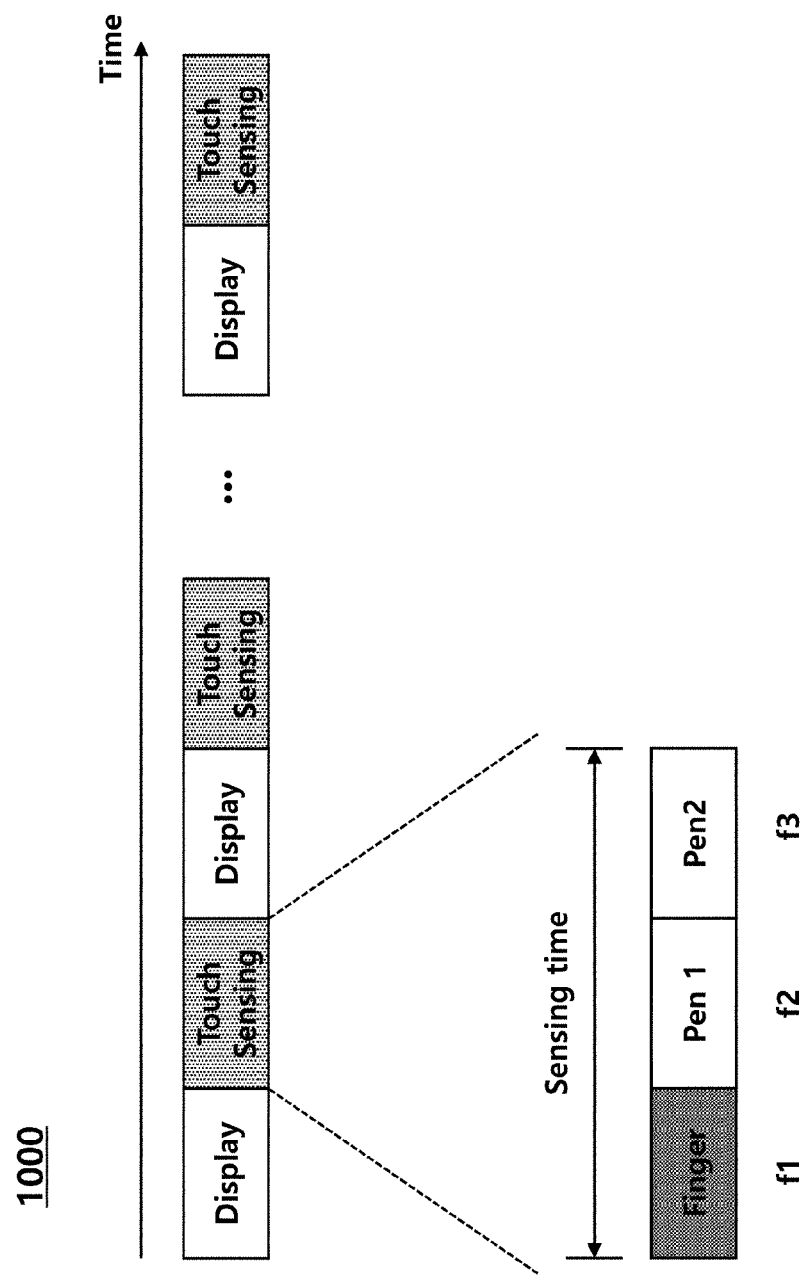
FIG. 15 is a diagram to assist in the explanation of a conventional touch sensing method by time division.

FIG. 15 is a diagram to assist in the explanation of a conventional touch sensing method by time division.

Referring to FIG. 15, a touch sensing method 1000 may drive a panel of the display device 100 by being divided into a display driving period and a touch sensing period. If necessary, the touch sensing period may be defined as a period in which a driving signal is transferred or a sensing signal is received.

The display driving period and the touch sensing period may be alternated as periods divided in terms of time.

When a plurality of objects touch or approach, touch sensing periods of the respective objects within one touch sensing period may be separated in terms of time so that the respective objects are individually sensed.

For example, a touch sensing period of a finger, a touch sensing period of a first stylus pen and a touch sensing period of a second stylus pen may be sequentially performed by being separated from one another.

In order to separately sense a touch of the finger, a touch of the first stylus pen and a touch of the second stylus pen, frequency bands of respective sensing signals may be sensed by being defined as a first frequency, a second frequency and a third frequency. The first to third frequencies may be selected as different frequencies for more accurate touch sensing, but may be selected as the same frequency if necessary.

When touch sensing of the plurality of objects is performed by time division, a driving time of the panel is increased, and thus, power consumption is increased.

In addition, since data sampling should be continuously performed, a data sampling rate decreases.

Figure 16:
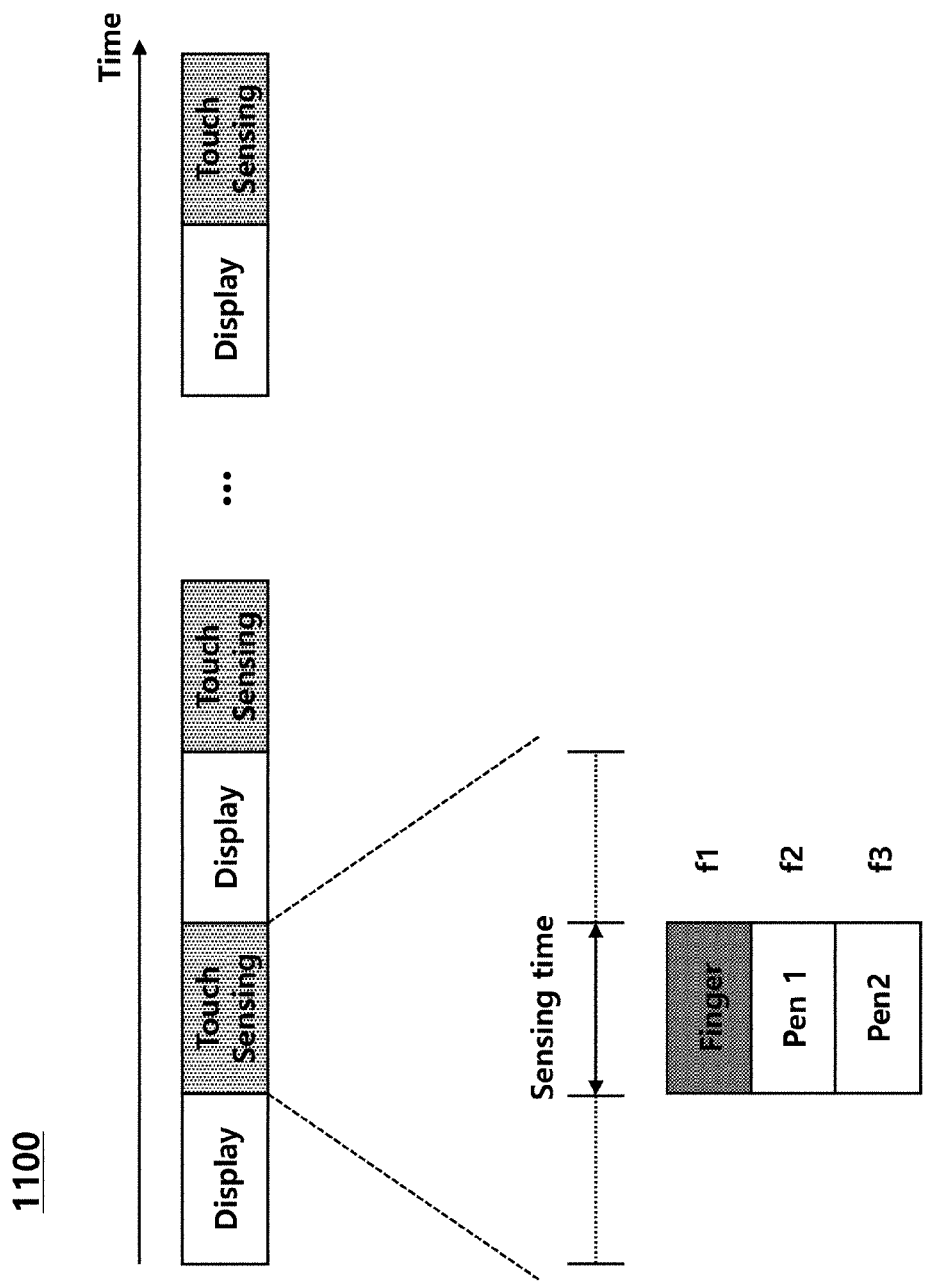
FIG. 16 is a diagram to assist in the explanation of a simultaneous touch sensing method in accordance with an embodiment.

FIG. 16 is a diagram to assist in the explanation of a simultaneous touch sensing method in accordance with an embodiment.

Referring to FIG. 16, unlike the conventional touch sensing method, a touch of a finger, a touch of a first stylus pen and a touch of a second stylus pen may be simultaneously sensed.

A touch sensing method 1100 may drive a panel of the display device 100 by being divided into a display driving period and a touch sensing period, but may sense a plurality of objects within the same time period of one specific touch sensing period.

By performing a discrete Fourier transform (DFT) in the digital signal processing circuit (DFB) by driving a finger and a pen at different frequencies, data may be simultaneously processed.

In this case, when orthogonality is maintained between the different frequencies, the accuracy of the data may be improved.

Since the digital signal processing circuit (DFE) may simultaneously sense multiple frequencies through the discrete Fourier transform (DFT), a driving time of the touch panel may be decreased, and the power consumption may be reduced. In this case, since a required data sampling time and the number of data samplings may be reduced, a data sampling rate may increase.

Data preprocessing may be required in the analog signal processing circuit (AFE) to perform the discrete Fourier transform (DFT) in the digital signal processing circuit (DFE). In this case, by forming an integrated analog signal processing circuit (AFE) without forming a separate circuit, the area of the analog signal processing circuit (AFE) may be reduced.

Figure 17:
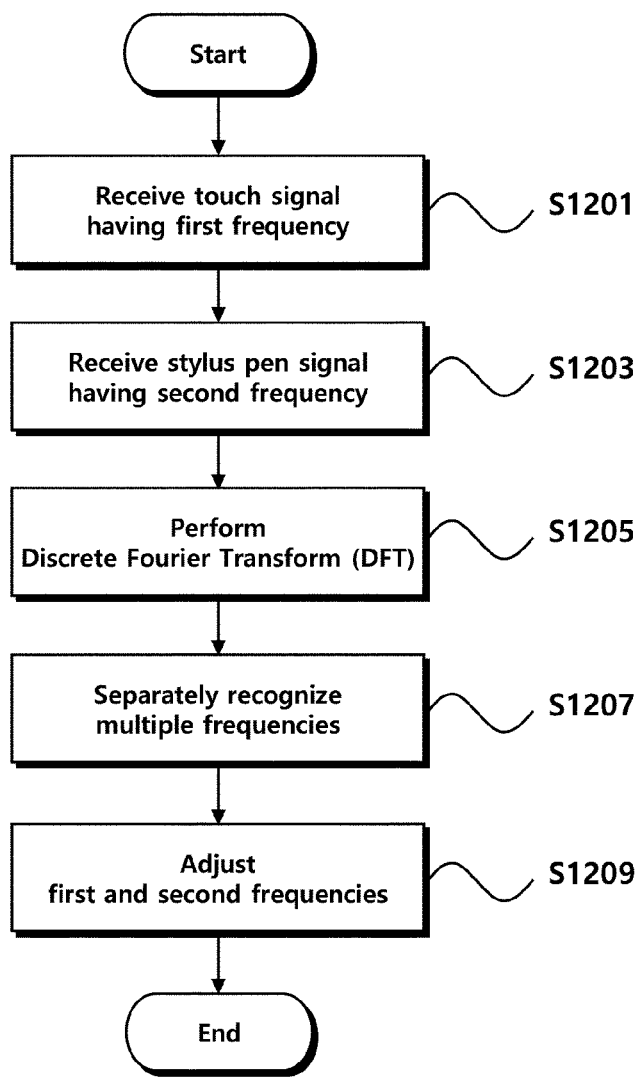
FIG. 17 is a flowchart to assist in the explanation of a frequency adjustment method for touch sensing in accordance with an embodiment.

FIG. 17 is a flowchart to assist in the explanation of a frequency adjustment method for touch sensing in accordance with an embodiment.

Referring to FIG. 17, a frequency adjustment method 1200 for touch sensing may include step of receiving a touch signal having a first frequency (S1201), step of receiving a stylus pen signal having a second frequency (S1203), step of performing a discrete Fourier transform in a digital signal processing circuit (S1205), step of separately recognizing multiple frequencies (S1207) and step of adjusting the separated first and second frequencies (S1209).

At the step of receiving the touch signal having the first frequency (S1201), a driving circuit of a readout circuit may transfer a driving signal STX having the first frequency, and may receive a sensing signal SRX having the first frequency by sensing a touch signal of an object.

The object may be, but is not limited to, at least one finger or at least one stylus pen.

The first frequency may mean at least one frequency set, and may mean a frequency set transferred to a sensing line at the same time. If necessary, each signal transferred to each sensing line may maintain orthogonality. The number and shape of frequencies of a signal transferred to each sensing line may be differently defined depending on a type of an object and a state of a display device.

The driving signal STX and the sensing signal SRX having the first frequency may be controlled by a touch control circuit or a timing controller in a touch sensing circuit.

At the step of receiving the stylus pen signal having the second frequency (S1203), the readout circuit may receive a downlink signal DL related to state information or touch information of a device, by a stylus pen. The stylus pen may transmit a downlink signal of a second frequency band distinguished from the first frequency. The stylus pen may generate a downlink signal of the second frequency band by its own power supply or frequency generator, but may generate the downlink signal DL of the second frequency corresponding to a frequency of an uplink signal UL transferred by a touch panel.

The second frequency may mean at least one frequency set, and may mean a frequency set transferred to a sensing line at the same time. If necessary, signals of the second frequency set may be set or controlled to maintain orthogonality with respect to signals of the first frequency set.

The touch control circuit may maintain the orthogonality between frequencies of separated signals by adjusting a frequency of a driving signal supplied to the touch panel. For example, when the touch panel simultaneously senses a touch of a stylus pen and a touch of an object, the orthogonality between touch sensing signals for the stylus pen and the object may be maintained by changing a frequency of a driving signal for the touch panel without changing a frequency of the touch sensing signal for the stylus pen.

At the step of performing the discrete Fourier transform in the digital signal processing circuit (S1205), sensing signals may be separated or processed through the discrete Fourier transform (DFT), the fast Fourier transform (FFT) or the sliding discrete Fourier transform (SDFT) described above.

At the step of separately recognizing the multiple frequencies (S1207), each of the converted first and second frequencies may be separately recognized.

The touch sensing circuit may receive a first touch signal having a first frequency and a second touch signal having a second frequency and separately perceive these touch signals. For example, the touch sensing circuit may separately sense a plurality of signals obtained in a same time period based on their frequencies.

At the step of adjusting the separated first and second frequencies (S1209), when orthogonality is not maintained between the first frequency and the second frequency, the first frequency or the second frequency may be controlled to maintain the orthogonality.

The touch sensing circuit may receive touch signals having the first frequency and the second frequency, which are separated by the discrete Fourier transform and determine the orthogonality between the first touch signal and the second touch signal on the basis of the received touch signals.

The touch control circuit may control the first frequency, which is a driving frequency of the touch panel, in response to the second frequency defined according to the protocol for the stylus pen.

The stylus pen may control the second frequency by changing the protocol in response to the first frequency which is a driving frequency of the touch panel.

Frequencies that the touch control circuit controls are not limited to the frequency of the touch panel or the frequency of the stylus pen.

The order of the respective steps of the frequency adjustment method 1200 for touch sensing may be changed, or some of the respective steps may be omitted.

Figure 18:
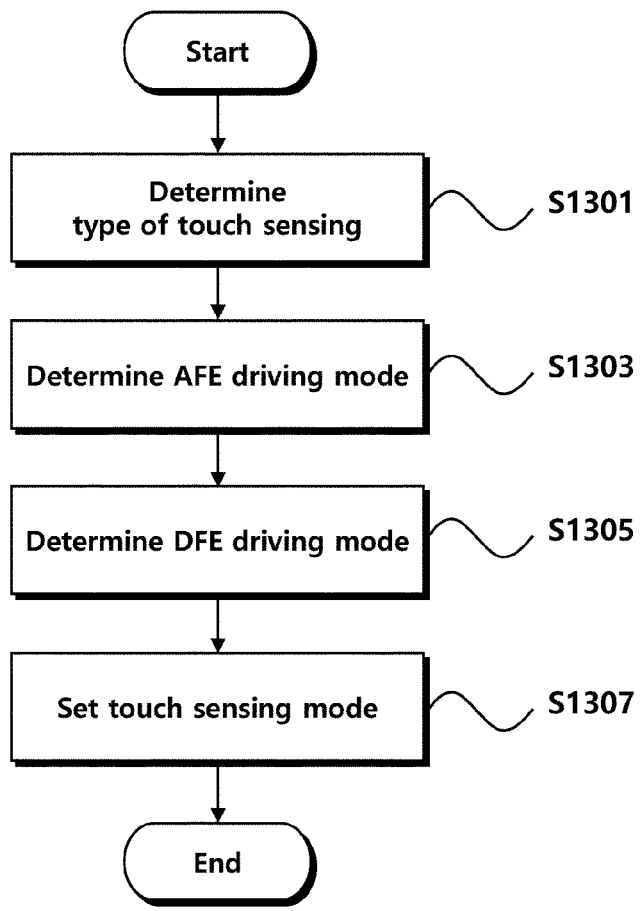
FIG. 18 is a flowchart to assist in the explanation of a touch sensing mode setting method in accordance with an embodiment.

FIG. 18 is a flowchart to assist in the explanation of a touch sensing mode setting method in accordance with an embodiment.

Referring to FIG. 18, a touch sensing mode setting method 1300 may include step of determining a type of a touch sensing (S1301), step of determining a driving mode of an analog signal processing circuit (S1303), step of determining a driving mode of a digital signal processing circuit (S1305) and step of setting a touch sensing mode (S1307).

At the step of determining the type of the touch sensing (S1301), a signal characteristic according to a type of an object may be determined, and a finger touch and a stylus pen touch may be separately determined. A type of a touch sensing may be determined in consideration of a touch area, a touch intensity and a downlink signal.

At the step of determining the driving mode of the analog signal processing circuit (S1303), the driving mode of the analog signal processing circuit may be determined in consideration of the type of the touch sensing and a type of a stylus pen.

An operation and role of a circuit may be differently defined or changed according to a driving mode of the analog signal processing circuit.

For example, a WGP type stylus pen may operate in the driving mode of the analog signal processing circuit (AFE) illustrated in FIG. 6.

For example, an active electrostatic (AES) type stylus pen may operate in the driving mode of the analog signal processing circuit (AFE) illustrated in FIG. 7.

For example, a finger touch may operate in the driving mode of the analog signal processing circuit (AFE) illustrated in FIG. 8.

The analog signal processing circuit (AFE) illustrated in FIG. 9 may change an operation according to a type of a touch sensing in one integrated analog signal processing circuit (AFE), by changing only a circuit configuration according to the type of the touch sensing.

At the step of determining the driving mode of the digital signal processing circuit (S1305), the driving mode of the digital signal processing circuit (DFE) may be determined in consideration of a type of a touch sensing and an operation of the analog signal processing circuit (AFE), as described above with reference to FIG. 10.

At the step of setting the touch sensing mode (S1307), a touch control circuit (not illustrated) may determine a final touch sensing mode by synthesizing determination results of the step of determining the type of the touch sensing (S1301), the step of determining the driving mode of the analog signal processing circuit (S1303) and the step of determining the driving mode of the digital signal processing circuit (S1305). The touch sensing circuit may change an operation of the analog signal processing circuit (AFE) and an operation of the digital signal processing circuit (DFE) according to the determined touch sensing mode.

The order of the respective steps of the touch sensing mode setting method 1300 may be changed, or some of the respective steps may be omitted.

Figure 19:
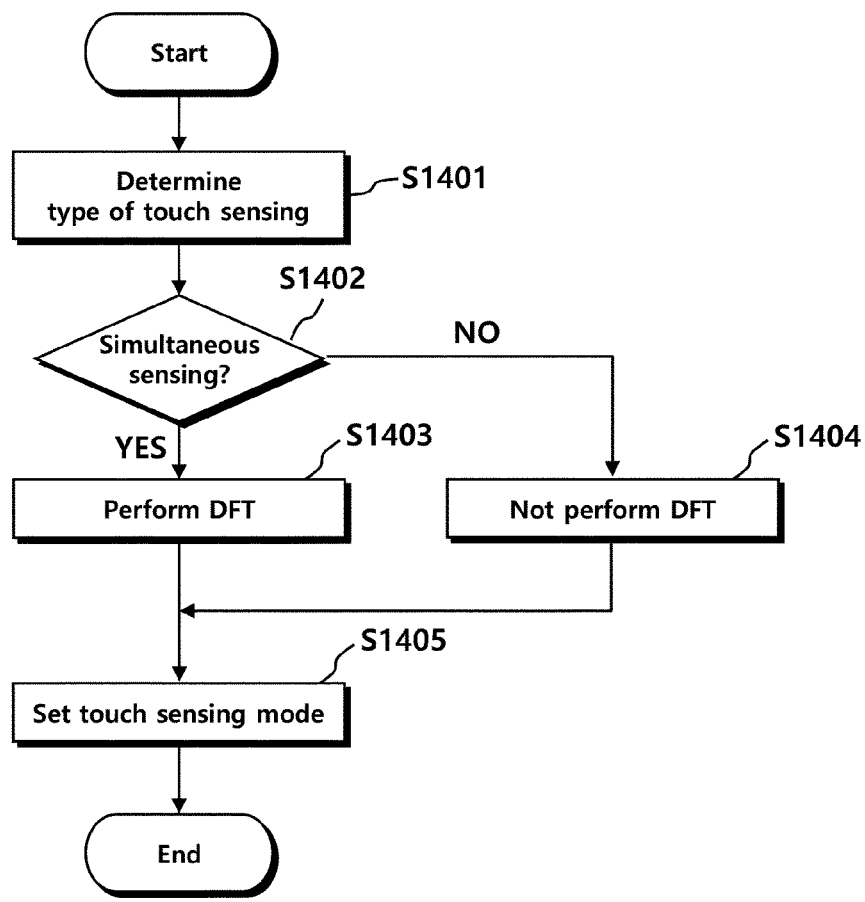
FIG. 19 is a flowchart to assist in the explanation of a touch sensing method in consideration of simultaneous sensing of touches by a stylus pen and a finger in accordance with an embodiment.

FIG. 19 is a flowchart to assist in the explanation of a touch sensing method in consideration of simultaneous sensing of touches by a stylus pen and a finger in accordance with an embodiment.

Referring to FIG. 19, a touch sensing method 1400 may include step of determining a type of a touch sensing (S1401), step of determining whether to perform simultaneous sensing of objects (S1402), step of performing a discrete Fourier transform (S1403), step of not performing a discrete Fourier transform (S1404) and step of setting a touch sensing mode (S1405).

At the step of determining the type of the touch sensing (S1401), the type of the touch sensing may be determined through the determination method described above with reference to FIG. 18.

At the step of determining whether to perform simultaneous sensing of objects (S1402), the number of objects to each of which a touch or an approach is recognized may be determined, and types of the objects may be determined.

When one object is recognized, it may be determined that simultaneous sensing is not performed, and a discrete Fourier transform may not be performed.

When a plurality of objects are recognized, it is determined that simultaneous sensing is performed, and a discrete Fourier transform may be performed. In this case, the method may further include step of considering in advance whether to perform a discrete Fourier transform, according to a waveform of a sensed signal.

At the step of performing the discrete Fourier transform (S1403), the digital signal processing circuit (DFE) may perform the discrete Fourier transform (DFT), and the above-described calculation methods may be used.

At the step of not performing the discrete Fourier transform (S1404), a discrete Fourier transform (DFT) may not be performed and a bypass circuit may be passed, or another driving mode in the digital signal processing circuit may be performed.

At the step of setting the touch sensing mode (S1405), a driving mode of a touch sensing may be determined. A touch sensing circuit (not illustrated) may change or control an operation or a circuit configuration of an analog signal processing circuit (AFE) or the digital signal processing circuit (DFE) according to the driving mode of the touch sensing.

What is claimed is:

1. A touch sensing circuit comprising:
   an analog signal processing circuit configured to receive a plurality of sensing signals having different frequencies from touch electrodes in a same period, the plurality of sensing signals including a first sensing signal corresponding to a driving signal of a touch panel and a second sensing signal corresponding to a downlink signal of a stylus pen; and
   a digital signal processing circuit configured to receive output data of the analog signal processing circuit and to perform a discrete Fourier transform with respect to the output data,
   wherein the digital signal processing circuit separates the first signal having a frequency of the driving signal of the touch panel and the second signal having a frequency of the downlink signal of the stylus pen by the discrete Fourier transform, wherein the frequency of the first signal and the frequency of the second signal are different.

2. The touch sensing circuit of claim 1, wherein the analog signal processing circuit comprises:
   at least one buffer configured to convert the sensing signals into current signals;
   a filter configured to perform filtering, according to a predetermined passband, for signals which have passed through the buffer; and
   an analog-to-digital converter configured to convert filtered analog signals into digital signals.

3. The touch sensing circuit of claim 1, wherein the analog signal processing circuit changes its operation in response to a driving mode of the digital signal processing circuit.

4. The touch sensing circuit of claim 1, wherein the digital signal processing circuit simultaneously separates a plurality of signals by a sliding discrete Fourier transform.

5. The touch sensing circuit of claim 4, wherein, according to the sliding discrete Fourier transform, another set of data is formed by changing the order in a set of sampling data of the digital signal processing circuit.

6. The touch sensing circuit of claim 1, further comprising:
   a touch control circuit configured to control a driving signal of a touch panel such that the orthogonality between frequencies of signals separated by the digital signal processing circuit is maintained.

7. The touch sensing circuit of claim 6, wherein the touch control circuit maintains the orthogonality between the frequencies of the separated signals by adjusting the frequency of the driving signal supplied to the touch panel.

8. A readout circuit comprising:
   a driving circuit configured to output, to a touch panel, driving signal having a first frequency; and
   a reception circuit configured to simultaneously receive a first sensing signal having the first frequency and a second sensing signal having a second frequency which is different from the first frequency and corresponding to a downlink signal transferred from a stylus pen,
   wherein a digital signal processing circuit in the reception circuit simultaneously performs a Fourier transform with respect to the first sensing signal and the second sensing signal so as to divide the first sensing signal and the second sensing signal.

9. The readout circuit of claim 8, wherein the driving circuit transfers a frequency corresponding to a frequency of a protocol of a stylus pen.

10. A touch sensing method comprising:
    receiving a first touch signal having a first frequency and corresponding to a driving signal of a touch panel;
    receiving a second touch signal having a second frequency distinguished from the first frequency and corresponding to a downlink signal of a stylus pen; and
    separating the touch signals respectively having the first frequency and the second frequency by a discrete Fourier transform simultaneously performing with respect to the touch signals,
    wherein the first touch signal and the second touch signal are received in a same time period.

11. The touch sensing method of claim 10, further comprising:
    determining the orthogonality between the first touch signal and the second touch signal based on the first frequency and the second frequency of the touch signals separated by the discrete Fourier transform.

12. The touch sensing method of claim 10, wherein the discrete Fourier transform is a sliding discrete Fourier transform used for separating signals having different frequencies by changing the order of digital signals.

13. The touch sensing method of claim 10, further comprising:
    receiving the first touch signal and the second touch signal and converting them into a first touch digital signal and a second touch digital signal,
    wherein the discrete Fourier transform separates the first touch digital signal and the second touch digital signal based on their frequencies.

* * * * *